(12) United States Patent
Caugherty et al.

(10) Patent No.: US 7,633,969 B2
(45) Date of Patent: Dec. 15, 2009

(54) METHODS, SYSTEMS, AND COMPUTER PROGRAM PRODUCTS FOR DYNAMICALLY ADJUSTING LOAD SHARING DISTRIBUTIONS IN RESPONSE TO CHANGES IN NETWORK CONDITIONS

(75) Inventors: Jill H. Caugherty, Cary, NC (US); Komal G. Khungar, Morrisville, NC (US); Peter J. Marsico, Chapel Hill, NC (US)

(73) Assignee: Tekelec, Morrisville, NC (US)

( * ) Notice: Subject to any disclaimer, the term of this patent is extended or adjusted under 35 U.S.C. 154(b) by 801 days.

(21) Appl. No.: 11/147,144

(22) Filed: Jun. 7, 2005

(65) Prior Publication Data

US 2006/0067503 A1   Mar. 30, 2006

Related U.S. Application Data

(60) Provisional application No. 60/608,917, filed on Sep. 10, 2004.

(51) Int. Cl.
*H04J 3/16*   (2006.01)
(52) U.S. Cl. .................................. 370/468; 370/437
(58) Field of Classification Search ................. 370/431, 370/437; 709/201, 203, 223, 226
See application file for complete search history.

(56) References Cited

U.S. PATENT DOCUMENTS

| | | | |
|---|---|---|---|
| 6,108,409 A | 8/2000 | Cooper et al. | |
| 6,282,280 B1 | 8/2001 | Rekieta et al. | |
| 6,327,472 B1 * | 12/2001 | Westroos et al. | 455/450 |
| 6,515,985 B2 | 2/2003 | Shmulevich et al. | |
| 6,647,113 B2 | 11/2003 | McCann et al. | |

(Continued)

FOREIGN PATENT DOCUMENTS

WO    WO 00/60812    10/2000

OTHER PUBLICATIONS

Notification of Transmittal of the International Search Report and the Written Opinion of the International Searching Authority; or the Declaration for International Application No. PCT/US05/32070 (Jul. 11, 2008).

(Continued)

*Primary Examiner*—Chi H Pham
*Assistant Examiner*—Fan Ng
(74) *Attorney, Agent, or Firm*—Jenkins, Wilson, Taylor & Hunt, P.A.

(57) ABSTRACT

A signaling network routing node, such as a signaling system 7 (SS7)/Internet protocol (IP) gateway, is adapted to perform global title translation (GTT) or other processing on received signaling messages and route the signaling messages to a member of a load sharing group using a threshold-based weighted load sharing algorithm. In the event that one of the signaling destinations in the load sharing group becomes unavailable, signaling message traffic is redistributed evenly among the remaining available members of the load sharing group in a manner such that a maximum load sharing weight threshold value associated with each group member is not exceeded. If a load sharing group member becomes unavailable, and the resulting recalculated load sharing weights of the remaining available members sum to less than 100%, then load sharing weights for the group are normalized, and a maximum message rate capacity threshold associated with each group member is used to determine whether the discarding of messages is required.

39 Claims, 16 Drawing Sheets

U.S. PATENT DOCUMENTS

| | | | |
|---|---|---|---|
| 6,662,017 | B2 | 12/2003 | McCann et al. |
| 6,760,343 | B1 | 7/2004 | Krishnamurthy et al. |
| 6,785,378 | B2 | 8/2004 | Mar |
| 6,788,774 | B1 | 9/2004 | Caldwell et al. |
| 6,826,198 | B2 | 11/2004 | Turina et al. |
| 6,901,262 | B2 | 5/2005 | Allison et al. |
| 7,023,794 | B2 | 4/2006 | Khan et al. |
| 7,050,562 | B2 | 5/2006 | Allison et al. |
| 7,068,733 | B2 | 6/2006 | Chang et al. |
| 7,092,505 | B2 | 8/2006 | Allison et al. |
| 7,127,057 | B2 | 10/2006 | Delaney et al. |
| 7,136,477 | B2 | 11/2006 | Craig et al. |
| 7,197,036 | B2 | 3/2007 | Craig |
| 7,257,215 | B2 * | 8/2007 | Angermayr et al. .... 379/221.08 |
| 7,286,524 | B1 | 10/2007 | Loftus |
| 7,372,953 | B2 | 5/2008 | Delaney et al. |
| 2001/0029182 | A1 | 10/2001 | McCann et al. |
| 2001/0055380 | A1 | 12/2001 | Benedyk et al. |
| 2002/0116522 | A1 * | 8/2002 | Zelig .......................... 709/235 |
| 2002/0176430 | A1 * | 11/2002 | Sangha et al. ............... 370/412 |
| 2002/0186702 | A1 | 12/2002 | Ramos et al. |
| 2003/0061234 | A1 | 3/2003 | Ali et al. |
| 2003/0108067 | A1 | 6/2003 | Craig et al. |
| 2003/0169779 | A1 | 9/2003 | Craig |
| 2004/0081206 | A1 | 4/2004 | Allison et al. |
| 2004/0203849 | A1 | 10/2004 | Allison et al. |
| 2004/0240658 | A1 | 12/2004 | Delaney et al. |
| 2004/0264675 | A1 | 12/2004 | Delaney et al. |
| 2005/0013290 | A1 | 1/2005 | Allison et al. |
| 2005/0111442 | A1 | 5/2005 | Delaney et al. |
| 2005/0120095 | A1 * | 6/2005 | Aman et al. ................. 709/219 |
| 2006/0013264 | A1 * | 1/2006 | Eichler et al. ............... 370/522 |
| 2008/0013446 | A1 | 1/2008 | Xu et al. |

OTHER PUBLICATIONS

Official Action for U.S. Appl. No. 10/993,738 (Nov. 13, 2008).
Supplementary European Search Report for European Patent Application No. 04811530.7 (Apr. 15, 2008).
Official Action for U.S. Appl. No. 10/993,738 (Feb. 5, 2008).
Notification of Transmittal of the International Search Report and the Written Opinion of the International Searching Authority, or the Declaration for International Application No. PCT/USO4/38827 (Jul. 11, 2006).
Jabbari, "Routing and Congestion Control in Common Channel Signaling System No. 7," Proceedings of the IEEE, vol. 80, No. 4, pp. 607-617 (Apr. 1992).

* cited by examiner

US 7,633,969 B2

METHODS, SYSTEMS, AND COMPUTER PROGRAM PRODUCTS FOR DYNAMICALLY ADJUSTING LOAD SHARING DISTRIBUTIONS IN RESPONSE TO CHANGES IN NETWORK CONDITIONS

RELATED APPLICATIONS

This application claims the benefit of U.S. Provisional Patent Application Ser. No. 60/608,917, filed Sep. 10, 2004; the disclosure of which is incorporated herein by reference in its entirety.

TECHNICAL FIELD

The subject matter described herein relates to techniques for load sharing signaling messages, such as signaling system 7 (SS7) signaling connection control part (SCCP) messages. More particularly, the subject matter described herein relates to methods, systems, and computer program products for employing dynamic load sharing weights and associated weight thresholds to improve load sharing performance.

BACKGROUND ART

It is well known in the telecommunications industry to route a signaling message through a signaling network using a technique that is commonly referred to as global title translation (GTT). In general terms, GTT is a routing procedure by which the destination signaling point associated with a signaling message is determined from digit information present in the message. Examples of such digit information include, a dialed 800 number, a calling card number, and a mobile subscriber identification number. Digit information may also include a signaling point identifier, such as a network entity address associated with a short message service center (SMSC) or other network signaling point. The destination signaling point may be a service control point (SCP) or application service node, which hosts telecommunications applications or services such as an 800/toll free database, a calling name database, a line information database, a home location register, an equipment identity register, an authentication center, a presence server, a voting server, an SMSC, a multimedia message center, a session initiation protocol (SIP) proxy or SIP re-direct server, etc. A destination signaling point may reside in a signaling system 7 (SS7) signaling network and be accessible via an SS7/message transfer part (MTP) signaling link, or the destination signaling point may reside in an Internet protocol (IP) network and be accessible via an IP signaling link.

A signal transfer point (STP) may perform global title translation and load share translated messages among multiple mated (i.e., identically provisioned) SCP nodes. As illustrated in FIG. 1, an STP 100, which includes a GTT database 102, may receive a signaling message from SS7 network 104, perform GTT processing on the message, and route the message to one of the identically provisioned SMSC nodes A-F. In this example, each SMSC node is effectively assigned a load sharing weight (LSW) value, which specifies the relative percentage of signaling message traffic that each SMSC node is to receive from STP 100. SMSC A is assigned an LSW value of 30, SMSC B is assigned an LSW value of 10, SMSC C is assigned an LSW value of 10, SMSC D is assigned an LSW value of 30, SMSC E is assigned an LSW value of 10, SMSC F is assigned an LSW value of 10.

Weighted load sharing techniques such as that described above and illustrated in FIG. 1 are widely used in the telecommunications industry and are described in telecommunications industry standards (e.g., Telcordia Technologies Generic Requirements, GR-82-CORE, Issue 5, December 2001). However, prior implementations of such standardized weighted load sharing approaches suffer from limitations that arise during various modes of failure in the system. More particularly, prior weighted load sharing solutions do not provide network operators with the flexibility to reallocate signaling message traffic in response to network anomalies in a manner that most efficiently utilizes available resources and maintains a high degree of system reliability.

Accordingly, in light of the difficulties associated with efficiently load sharing signaling messages among multiple signaling destinations during sub-nominal network operating conditions, there exists a need for improved methods, systems, and computer program products for load sharing signaling messages in a telecommunications network.

DISCLOSURE OF THE INVENTION

The subject matter described herein includes a signaling network routing node, such as a signal transfer point (STP), that may perform global title translation (GTT) on received signaling messages and subsequently route them to a destination signaling point using a threshold-based weighted load sharing algorithm. Mated signaling points are assigned to a load sharing group, and load sharing percentages or weights are assigned to each signaling point in the group. Also associated with each destination signaling point in the load sharing group is a maximum load sharing weight threshold (MWT) value, which specifies the maximum percentage of load shared message traffic that each member of the load sharing group is allowed to receive.

In the event that one of the signaling points in the load sharing group becomes unavailable, signaling message traffic is redistributed evenly among the remaining available members of the load sharing group in a manner such that the MWT threshold value associated with each load sharing group member is not exceeded. If the MWT threshold value of a load sharing group member is reached, and traffic cannot be reassigned to other group members without exceeding their threshold values, then signaling message traffic may be discarded. If a load sharing group member becomes unavailable, and the resulting recalculated load sharing weights of the remaining available members sum to less than 100%, then load sharing weights for the group are normalized, and a maximum message rate capacity threshold associated with each group member is used to determine whether the discarding of messages is necessary.

The functions for providing threshold-based weighted load sharing are described herein as modules, applications, or processes. It is understood that these modules, applications, or processes may be implemented as computer-executable instructions embodied in a computer-readable medium. Alternatively, the modules, applications, or processes described herein may be implemented entirely in hardware. In yet another alternative embodiment, the modules, applications, or processes described herein may be implemented as a combination of hardware and software.

The modules, applications, and processes for providing threshold-based weighted load sharing functionality are described below as being associated with cards or subsystems within an STP or signaling system 7 (SS7)/Internet protocol (IP) signaling gateway routing node. It is understood that these cards or subsystems include hardware for storing and executing the processes and modules. For example, each card or subsystems described below may include one or more microprocessors, such as an x86 microprocessor available from Intel Corporation or a K-series microprocessor available from AMD Corporation, and associated memory.

In one exemplary implementation, the methods for providing threshold-based weighted load sharing described herein may be implemented as computer-executable instructions embodied in a computer-readable medium. Exemplary computer readable media for implementing the subject matter described herein include chip memory devices, disk memory devices, application specific integrated circuits, and programmable logic devices. In addition, a computer program product that implements the subject matter described herein may reside on a single physical device or multiple physical devices or computing platforms.

Accordingly, it is an object of the subject matter described herein to provide a method and system for flexibly re-distributing message traffic to a group of mated signaling destinations, in response to the failure of one or more members of the group, without overloading the remaining available members of the group.

Some of the objects of the invention having been stated hereinabove, other objects will become evident as the description proceeds, when taken in connection with the accompanying drawings as best described hereinbelow.

BRIEF DESCRIPTION OF THE DRAWINGS

Preferred embodiments of the invention will now be described with reference to the accompanying drawings of which.

DETAILED DESCRIPTION OF THE INVENTION

Figure 1:
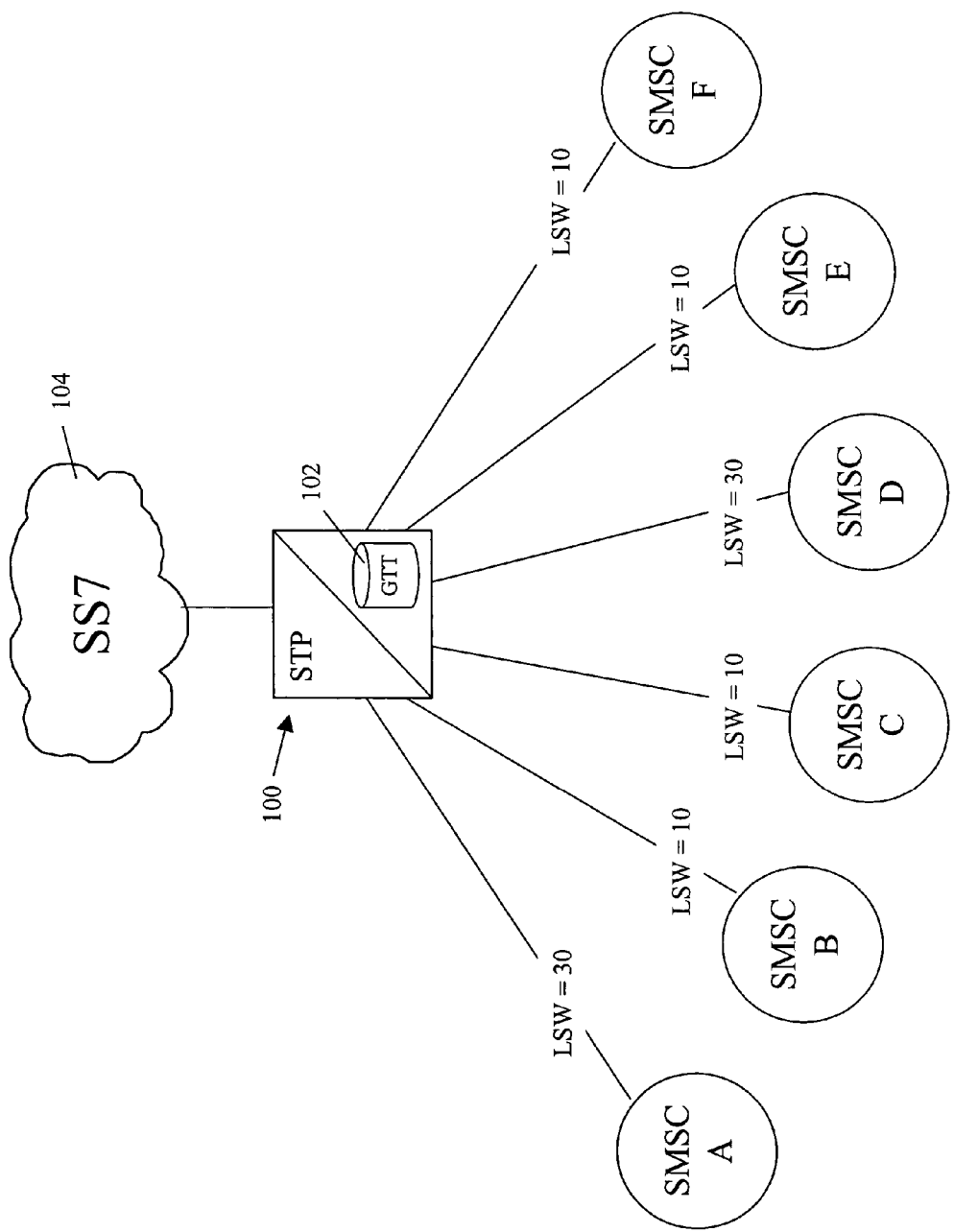
FIG. 1 is a network diagram illustrating a signal transfer point (STP) configured to load share signaling message traffic among several mated signaling destinations.
Figure 2:
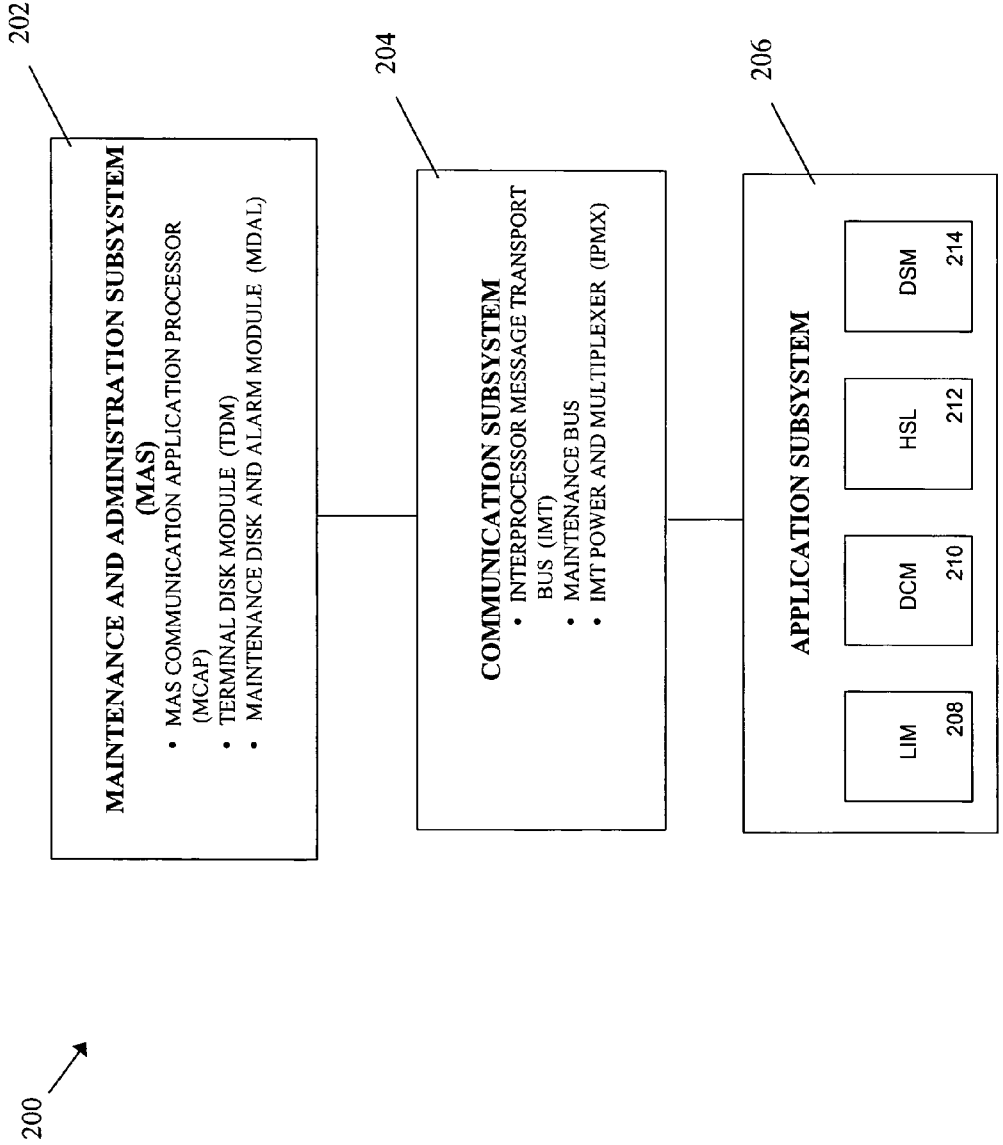
FIG. 2 is a block diagram illustrating an exemplary architecture of a signaling gateway (SG) routing node suitable for use with embodiments of the subject matter described herein.

Embodiments of the subject matter described herein may include an underlying hardware platform similar to a signaling system 7 signal transfer point (STP) or SS7/Internet protocol (IP)-capable signaling gateway (SG) routing node. Exemplary STP or SG hardware platforms suitable for use with embodiments of the subject matter described herein include the EAGLE® STP and the IP$^7$ Secure Gateway®, both available from Tekelec of Calabasas, Calif. A block diagram that generally illustrates the base internal architecture of the IP$^7$ Secure Gateway® is shown in FIG. 2. In FIG. 2, an IP$^7$ Secure Gateway® 200 includes the following subsystems: a maintenance and administration subsystem (MAS) 202, a communication subsystem 204, and an application subsystem 206. MAS 202 provides maintenance communications, initial program load, peripheral services, alarm processing and system disks. Communication subsystem 204 includes an interprocessor message transport (IMT) bus that is the main communication bus among all subsystems in IP$^7$ Secure Gateway® 200. The IMT bus includes two 1 Gbps counter-rotating serial rings. Application subsystem 206 includes application cards (e.g., printed circuit boards) capable of communicating with the other cards through the IMT bus. Numerous types of application cards can be incorporated into SG 200, including: a link interface module (LIM) 208 that interfaces with SS7 links and X.25 links; a data communication module (DCM) 210 that provides an IP signaling interface, which may be adapted to support SS7-over-IP adaptation protocols (e.g., Internet Engineering Task Force SIGTRAN protocol suite, Tekelec transport adaptation layer interface, etc.) or other signaling protocols (e.g., session initiation protocol, H.323, etc.); a high-speed link (HSL) module that is adapted to provide signaling (e.g., SS7, SIGTRAN, SIP, H.323, etc.) over asynchronous transfer mode (ATM) links; and an database service module (DSM) 214 that may be adapted to support various applications, including but not limited to, global title translation, number portability translation, and other communication network services.

Exemplary Routing Node Architecture

Figure 3:
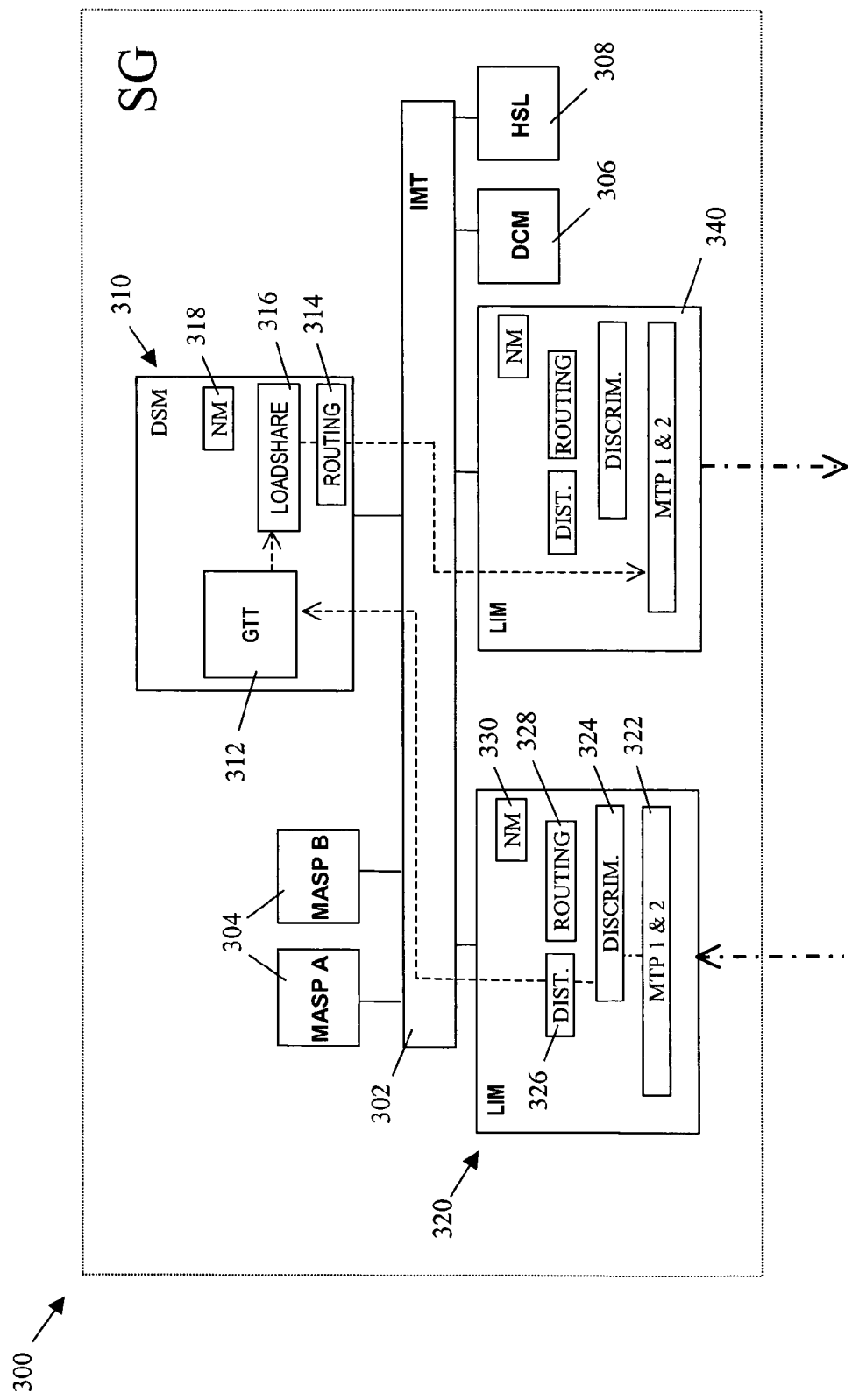
FIG. 3 is a system block diagram illustrating a SG routing node including an integrated database services module for performing global title translation (GTT) processing and dynamic load sharing of signaling messages according to an embodiment of the subject matter described herein.

FIG. 3 is a block diagram illustrating an exemplary internal architecture for an SG routing node according to one embodiment of the subject matter described herein. SG routing node 300 illustrated in FIG. 3 includes a high-speed interprocessor message transport communications bus 302. A number of distributed processing modules or cards are coupled to IMT bus 302 including: a pair of maintenance and administration subsystem processors (MASPs) 304, a DCM communication module 306 that is used to communicate with signaling points via an IP signaling interface, an HSL communication module 308 for communicating with signaling points via an ATM signaling interface, a DSM module 310 for providing global title translation service, a first SS7 LIM 320, and a second SS7 LIM 340. These modules are physically connected to the IMT bus 302 such that signaling and other type messages may be routed internally between all active cards or modules. For simplicity of illustration, only a single DCM, HSL, and DSM module are included in FIG. 3. However, it will be appreciated that the distributed, multi-processor architecture of the SG routing node 300 may include multiple LIM, DCM, HSL, DSM and other processing and communication cards, all of which may be simultaneously connected to and communicating via IMT bus 302.

From a hardware perspective, LIMs 320 and 340 may each include a printed circuit board physically connected to IMT bus 302. Each printed circuit board may include a communication processor programmed to send and receive messages via IMT bus 302. Each printed circuit board may also include an application processor programmed to perform various functions. For example, the application processor of LIM 320 may be programmed to perform the functions described herein for providing gateway screening, message discrimination, signaling network management, message transfer part (MTP) routing, and other signaling message processing functions. In one embodiment of the subject matter described herein, routing address translation processing functionality (e.g., GTT, number portability translation, etc.) may also reside on a LIM, although for the purpose of illustration, routing address translation services, such as GTT, are described herein with respect to DSM-based implementations.

SS7 Link Interface Module Architecture And Operation

Referring once again to FIG. 3 and focusing now on exemplary LIM card functionality, LIM 320 may include: an SS7 message transfer part (MTP) level 1 and 2 function 322, a discrimination function 324, a distribution function 326, an MTP routing function 328, and a network management function 330. MTP level 1 and 2 function 322 provides the facilities necessary to send and receive digital data over a particular physical medium, such as a DS0 communication link or an optical communication link (e.g., an OC-n signaling link) and also performs error detection, error correction, and provides for the sequenced delivery of SS7 message packets. Discrimination function 324 receives signaling messages from the lower MTP processing layers and performs a discrimination function, effectively determining whether an incoming SS7 message packet requires internal processing or is simply to be through-switched.

With particular regard to the handling of signaling connection control part (SCCP) messages, discrimination function 324 may examine a destination point code (DPC) parameter in a received SS7 signaling message to determine whether the message is addressed to a point code (PC) associated with the SG node 300. Discrimination function 324 may also examine a service indicator (SI) parameter in the received SS7 signaling message to determine if the message is an SCCP message. An SI parameter value of 3 is typically used in the SS7 protocol to indicate an SCCP message. If it is determined that a received signaling message is an SCCP message, then discrimination function 324 may pass the message to distribution function 326.

In one embodiment, distribution function 326 is adapted to receive an SCCP message from the discrimination function and examine a routing indicator (RI) contained in the message to determine whether global title translation service is required. An RI parameter value of 0 is typically used in the SS7 protocol to indicate that an SCCP message requires GTT processing. If it is determined that the received SCCP message requires GTT processing, function 326 is adapted to forward the message to an appropriately configured application processing module (e.g., DSM module), where GTT processing is performed.

Once again, it will be appreciated that the subject matter described herein is not limited to the load sharing of signaling messages that have undergone GTT processing. In another embodiment, distribution function is adapted to receive an SCCP message from the discrimination function and examine a variety of message parameters including a DPC parameter, an origination point code (OPC), an RI parameter, a subsystem number (SSN) parameter, a nature of address indicator (NAI), a numbering plan (NP) indicator, a network domain indicator, a global title indicator (GTI), and a translation type (TT) contained in the message to determine the type of application service processing that is required. Application services may include number portability translation service, flexible mobile services routing, SS7-to-SIP gateway protocol translation service, etc. GTT service is simply one example of a routing address translation service that may be provisioned on SG 300.

With respect to a received signaling message that is to be through-switched, routing function 328 is adapted to perform MTP routing processing on the message once it is received from discrimination function 324. In doing so, routing function 328 may utilize routing rule data stored in an associated routing database to select and outbound signaling link over which the message is to be transmitted. NM function 330 is adapted to provide SS7 network management support on behalf of all SS7 signaling links that are provisioned on LIM 320. As such NM function 330 is adapted to share status information with routing function 328 so that routing rule data may be maintained with the most current view of routing system and network status possible.

Database Service Module Architecture And Operation

The exemplary DSM module 310 illustrated in FIG. 3 is adapted to provide GTT translation service for messages received by SG 300. DSM 310 is further adapted to implement a high traffic threshold-based load sharing algorithm according to one embodiment of the subject matter described herein. DSM 310 includes a GTT routing address translation function 312, an MTP routing function 314, a load sharing function 316, and an SS7 NM function 318. MTP routing function 314 and NM function 318 perform operations similar to that described previously with respect to their LIM-based counterparts, and as such are not described again in this section. In one embodiment, GTT translation function 312 includes a binary tree (B-tree) global title address (GTA) data structure as well as several ancillary data structures, which contain the information necessary to perform GTT processing on a received SCCP signaling message. It will be appreciated that the data structures presented herein are exemplary and intended to generally illustrate GTT processing. Table 1 shown below includes GTT selector data, which allows a GTT translation data set (i.e., SetName) to be determined based on a three-parameter lookup key. More particularly, a GTT translation data SetName identifier is determined by performing a lookup in the GTT selector data using a network domain, a global title indicator, and a translation type value associated with an SCCP signaling message that is to be translated. In some cases, an additional lookup using translation type, numbering plan and nature of address indicator parameter values may be required using SetName mapping information in Table 2, in order to completely determine the appropriate GTT translation data SetName identifier.

TABLE 1

| GTT Selector Data | | | | |
|---|---|---|---|---|
| Domain | GTI | TT | SetName | NP/NAI |
| ANSI | n/a | 1 | SetA | No |
| ITU | 4 | 1 | n/a | Yes |

TABLE 2

| NP/NAI Mappings | | | |
|---|---|---|---|
| TT | NP | NAI | SetName |
| 1 | 3 | 1 | SetA |
| 1 | 3 | 2 | SetB |
| 1 | 3 | 3 | SetC |

Once a translation data SetName has been determined, the SetName is used in Table 3 to select a B-tree handle and the number of GTA digits to be used in the B-tree search. The selected B-tree handle identifier is then resolved to a starting B-tree node address using information in B-tree Handle Table 4. Using the starting B-tree node address information and GTA information contained in the SCCP signaling message, the GTA data B-tree structure is searched using a B-tree search algorithm until a matching entry or node is located.

TABLE 3

| GTT Set Data | | |
|---|---|---|
| SetName | B-tree Handle | Digits |
| SetA | HandleA | 6 |
| SetB | HandleB | 10 |

TABLE 4

| B-tree Handle Data | |
|---|---|
| B-tree Handle | Starting Node |
| HandleA | Node 234 |
| HandleB | Node 123 |

The matching entry or node in the B-tree data structure may include routing information, such as a DPC, an SSN, a routing indicator, and a translation type. With this routing information determined, load sharing processing may be performed.

With respect to Internet Engineering Task Force (IETF) SIGTRAN SCCP user adaptation (SUA) messages, the global title address and/or other parameters used for GTT processing may be extracted from the destination address field of an SUA connectionless data transfer message (CLDT). An SUA CDLT message is similar to an SCCP Unitdata (UDT) message. GTT processing may be performed using parameters extracted from the destination address field of an SUA message to yield a DPC/SSN address in a manner similar to that described above with respect to SCCP messages. With this routing information determined, load sharing processing may be performed.

It will be appreciated that global title translation processing is simply one example of a signaling message processing application that may be used in conjunction with the dynamic load sharing functionality of the subject matter described herein. Other signaling message processing applications, such as the flexible mobile services routing application described in commonly-assigned, co-pending U.S. patent application Ser. No. 09/471,946, filed Dec. 23, 1999, the disclosure of which is incorporated herein by reference in its entirety, may be implemented in conjunction with the subject matter described herein. It will be further appreciated that signaling message processing applications used in conjunction with the subject matter described herein are not limited to routing address translation applications.

Load Sharing Functionality

In one embodiment of the subject matter described herein, load sharing information is maintained in a mated point code/subsystem data structure that resides on a DSM module 310. Table 5 includes exemplary information that may be maintained in a mated PC/SSN data structure that is associated with load sharing function 316. More particularly, Table 5 includes an SS7 point code field, an associated SCCP SSN address field, a PC/SSN status field, a load sharing (LS) group identifier field, a LS mode field, a relative cost field, a nominal load sharing weight (LSW) field, a dynamic LSW field, a maximum LS weight threshold (MWT) field, and a maximum message rate capacity threshold (MCT) field. It will be appreciated that more efficient and higher-performance data structures that include similar information may be implemented within the scope of the subject matter described herein. The data in Table 5 is intended to illustrate exemplary information that may be used to facilitate the contemplated load sharing functionality.

TABLE 5

Mated PC/SSN Data

| PC | SSN | Status | LS Group | LS Mode | Rel Cost | Nom LSW | Dyn LSW | MWT | MCT |
|---|---|---|---|---|---|---|---|---|---|
| 1-1-1 | 12 | Avail | LSG1 | WP | n/a | 30 | 30 | 60 | 75 |
| 1-1-2 | 12 | Avail | LSG1 | WP | n/a | 10 | 10 | 40 | 75 |
| 1-1-3 | 12 | Avail | LSG1 | WP | n/a | 10 | 10 | 40 | 75 |
| 1-1-4 | 12 | Avail | LSG1 | WP | n/a | 30 | 30 | 65 | 75 |
| 1-1-5 | 12 | Avail | LSG1 | WP | n/a | 10 | 10 | 20 | 50 |
| 1-1-6 | 12 | Avail | LSG1 | WP | n/a | 10 | 10 | 30 | 50 |
| 1-1-1 | 10 | Avail | LSG2 | Dom | 10 | 100 | 100 | 100 | 85 |
| 1-1-2 | 10 | Avail | LSG2 | Dom | 20 | 100 | 100 | 100 | 80 |
| 1-1-3 | 10 | Avail | LSG2 | Dom | 30 | 100 | 100 | 100 | 70 |
| 1-1-1 | 14 | Avail | LSG3 | Cbd | 10 | 50 | 50 | 60 | 80 |
| 1-1-2 | 14 | Avail | LSG3 | Cbd | 10 | 50 | 50 | 60 | 80 |
| 1-1-3 | 14 | Avail | LSG3 | Cbd | 20 | 25 | 25 | 40 | 60 |
| 1-1-4 | 14 | Avail | LSG3 | Cbd | 20 | 25 | 25 | 40 | 60 |
| 1-1-5 | 14 | Avail | LSG3 | Cbd | 20 | 25 | 25 | 40 | 60 |
| 1-1-6 | 14 | Avail | LSG3 | Cbd | 20 | 25 | 25 | 40 | 60 |

In any event, PC/SSN addresses provisioned in this table are adapted to participate in the post-GTT translation load sharing of SCCP signaling messages. The LS group identifier is used to define a mated group of PC/SSN destinations that are to have their signaling message traffic load shared. The LS mode identifier is used to specify the type of load sharing that is to be performed on an associated LS group. Examples of load sharing modes include modes that are referred to herein as weighted percent (WP), dominant (Dom), and combined Dom/WP (Cbd).

In a weighted percent load share mode, signaling message traffic is distributed among all of the PC/SSN destinations in a load sharing group according to a set of specified LSW values. Within the context of weighted percent load sharing, an LSW value may be interpreted as a normalized percentage of the total received signaling message traffic that is destined for a load shared PC/SSN. For example, an LSW value of 10 may be interpreted as meaning that 10 out of every 100 messages destined for a load shared PC/SSN will be routed to a group member with an LSW value of 10. A set of nominal condition LSW may be specified by a network operator, which define load sharing distribution among group members under normal operating conditions.

These nominal LSW values are stored in the nominal LSW field of Table 5. In response to variations in network conditions, such as changes in load sharing group member availability or congestion status, the nominal LSW values may be dynamically altered according to a dynamic LSW algorithm, and the resulting new LSW values maintained in the dynamic LSW field of Table 5. From an operational standpoint, it is the dynamic LSW values that are used during load sharing processing operations, and under nominal operating conditions the nominal LSW and dynamic LSW are equal. Associated with each weighted percent load shared destination is a maximum load sharing weight threshold value, MWT, which specifies the maximum LSW allowed for each destination in the event of sub-nominal operating conditions. Also associated with each weighted percent load shared destination is a maximum message rate capacity threshold value, MCT, which effectively specifies the maximum message receiving capacity for each destination. In one embodiment, MCT values may be specified in terms of a message receipt rate, such as messages per second. For example, an MCT value of 85 associated with a weighted percent load share destination may be used to indicate that the maximum number of messages that may be routed to the destination in a 1 second interval is 85 messages. The MCT threshold serves to ultimately limit message flow to a load shared destination, regardless of the number of messages that could theoretically be routed to the destination based on the destination's current assigned dynamic LSW value. Consequently, it will be appreciated that load sharing weights may be used to effectively control or groom the relative distribution of load shared traffic among members of a load sharing group, while maximum capacity thresholds effectively determine the maximum message flow rate to each member of the load share group.

In a dominant load share mode, a single PC/SSN destination is designated as the primary or preferred recipient of signaling message traffic via specification of the lowest relative cost parameter value in a load share group. All PC/SSN destinations in a dominant load sharing group have different relative cost values, and 100% of load shared signaling message traffic is routed to the lowest cost or preferred PC/SSN destination, provided that the preferred destination is available. If the preferred PC/SSN destination is unavailable, 100% of load shared signaling message traffic is routed to the next lowest cost PC/SSN destination in the load sharing group that is available.

In a combined dominant-weighted percent load share mode, at least two members of the load share group are designated as the primary or preferred recipients of signaling message traffic. That is, at least two members of a Cbd load share group share the same, lowest relative cost value in the group. The remaining members of the load share group share the same relative cost value, which is higher than that of the primary or preferred message recipients. Post-GTT translated signaling message traffic is shared between the preferred PC/SSN destinations. If the preferred PC/SSN destinations become unavailable or congested, signaling message traffic is distributed among the remaining group members based on the nominal LSW values or based on the computed dynamic LSW values in event of sub-nominal conditions. Maximum LS weight threshold and maximum message rate capacity values are specified for each member of a combined load sharing group, in a manner similar to that previously described with respect to weighted percent load sharing.

Dynamic Load Sharing Weight Adjustment

Load sharing function 316 illustrated in FIG. 3 may monitor the operational status of load sharing group members, post-GTT translated signaling message traffic, and load sharing criteria related to a load sharing group, and to facilitate distribution of the post-GTT message traffic accordingly among members of the load sharing group. In one embodiment of the subject matter described herein, operational status information includes but is not limited to, destination availability and load sharing metrics, such as allocated message count data and calculated message allocation rate data. Exemplary load sharing metrics are illustrated below in Table 6. Associated with each entry in Table 6 is a PC/SSN identifier, dynamic LSW and maximum message receipt rate capacity parameters described above with respect to Table 5. Message load sharing (LS) allocation status information is also included in Table 6, which essentially maintains counts of the number of messages shared to each member of a load sharing group. Calculated message LS allocation rate data is also included, which reflects the number of load shared messages allocated to a load sharing group member per unit of time (e.g., messages per second, etc.).

TABLE 6

Load Sharing Metrics

| PC | SSN | Dyn LSW | Message LS Allocation Status | MCT | Message LS Allocation Rate |
|---|---|---|---|---|---|
| 1-1-1 | 12 | 30 | 21 | 75 | 40 |
| 1-1-2 | 12 | 10 | 10 | 75 | 20 |
| 1-1-3 | 12 | 10 | 10 | 75 | 20 |
| 1-1-4 | 12 | 30 | 20 | 75 | 38 |
| 1-1-5 | 12 | 10 | 10 | 50 | 19 |
| 1-1-6 | 12 | 10 | 10 | 50 | 18 |
| 1-1-1 | 14 | 50 | 2 | 80 | 45 |
| 1-1-2 | 14 | 50 | 1 | 80 | 56 |
| 1-1-3 | 14 | 25 | 0 | 60 | 0 |
| 1-1-4 | 14 | 25 | 0 | 60 | 0 |
| 1-1-5 | 14 | 25 | 0 | 60 | 0 |
| 1-1-6 | 14 | 25 | 0 | 60 | 0 |

In one embodiment of the subject matter described herein, a dynamic load sharing algorithm is adapted to maintain and use information similar to that presented in Tables 5 and 6 in order to load share signaling messages among one or more members of a designated load sharing group. Dynamic load sharing weight values are used to determine the relative percentage of signaling message traffic that is to be directed to each member of a defined load sharing group. A dynamic weight adjustment algorithm is adapted to monitor information similar to that presented in Tables 5 and 6, and modify dynamic LSW values, as necessary, in order to insure optimal load sharing during sub-nominal operating conditions. These two algorithms work cooperatively to provide the dynamic load sharing functionality of the subject matter described herein.

Figure 4A:
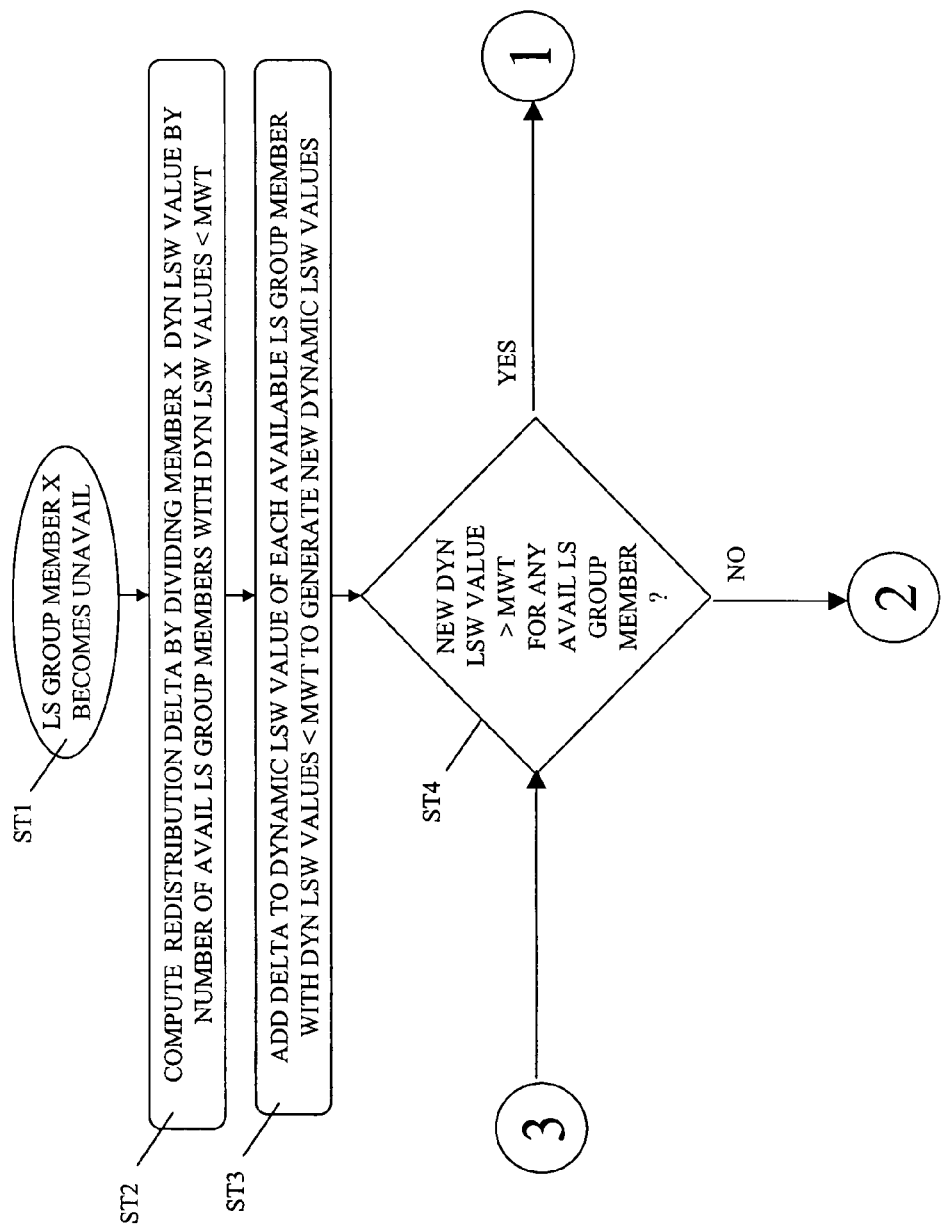
FIGS. 4A and 4B are a flow chart illustrating exemplary steps that may be associated with the modification of load sharing weight values in response to signaling destination unavailability according to an embodiment of the subject matter described herein.
Figure 4B:
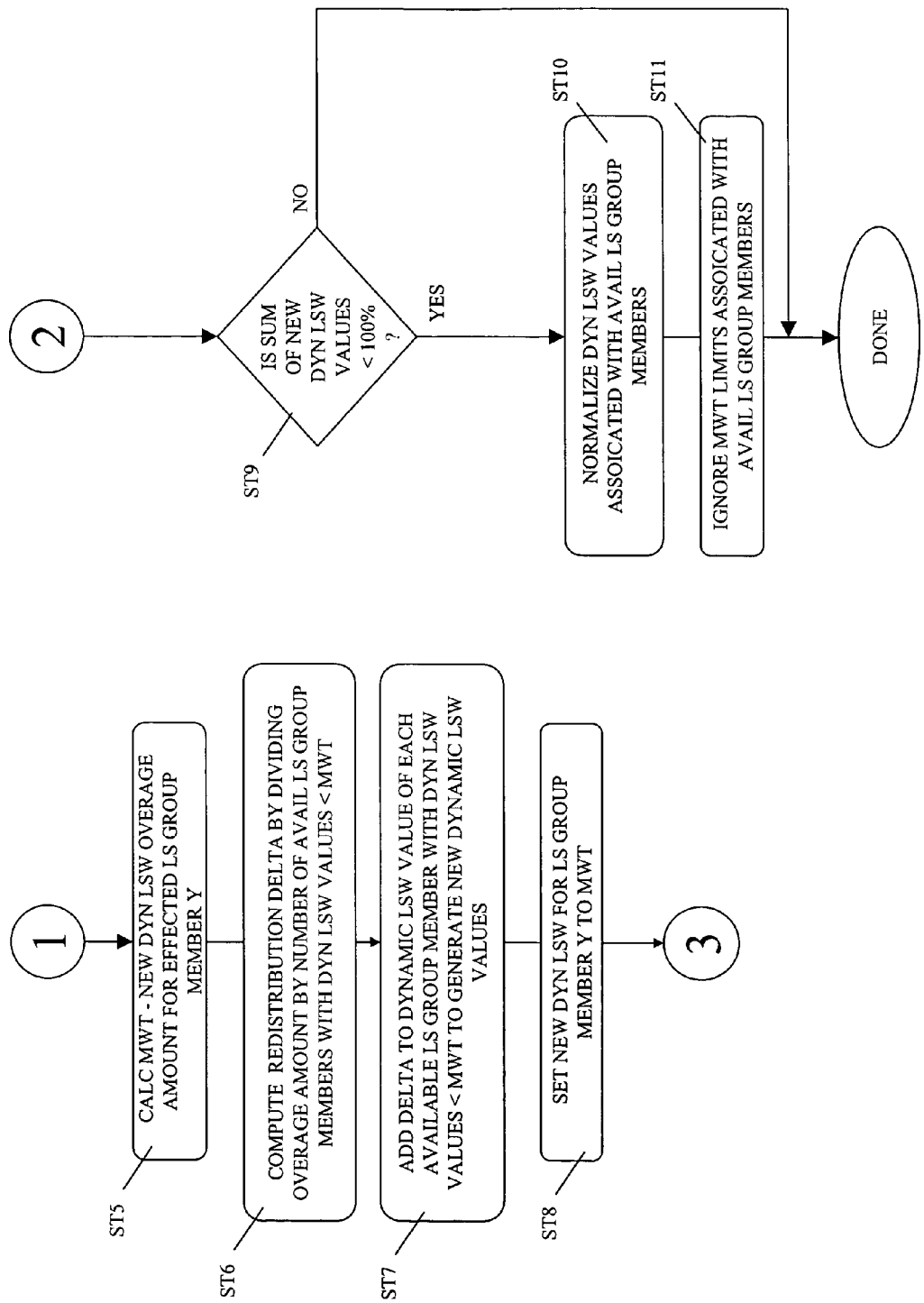

FIGS. 4A and 4B are a flow chart, which illustrates exemplary functionality associated with a dynamic weight adjustment algorithm of the subject matter described herein. Beginning with step ST1, consider the case where a load sharing group member becomes unavailable. In response to this situation, the dynamic weight adjustment algorithm initiates processing that re-calculates dynamic LSW values associated with the load sharing group to which the effected member belongs. According to one embodiment, re-distribution of dynamic LSW values is accomplished by dividing the effected group member's dynamic LSW value by the number of remaining available group members which have dynamic LSW values that are less than their associated maximum weight thresholds (ST2). The resulting re-distribution delta is then added to the dynamic LSW value of each remaining available group member that has a dynamic LSW value which is less than the associated maximum weight threshold, so as to yield a new dynamic LSW value for each of these available group members (ST3).

In step ST4, a check is performed to determine whether each new dynamic LSW value exceeds the associated maximum weight threshold value for each of these available group members. If it is determined that the new dynamic LSW associated with group member Y exceeds the group member Y's MWT, then the difference between member Y's MWT and the new dynamic LSW is calculated (ST5), and this difference is distributed evenly among those remaining available group members with dynamic LSW values which are less than their associated MWT thresholds (ST6 and ST7). The dynamic LSW value of group member Y is subsequently set equal to the associated MWT threshold (ST8). In step ST9, a check is performed to determine if the newly re-calculated dynamic LSW values associated with the available group members sum to less than 100%. If the sum is less than 100%, the newly re-calculated dynamic LSW values are normalized so as to sum to 100%. In this case, MWT limitations are ignored following normalization (ST10). In step ST9, if the newly re-calculated dynamic LSW values associated with the available group members sum to 100%, then weight normalization is not required.

In an alternate embodiment of the subject matter described herein, in response to determining in step ST9 that the newly re-calculated dynamic LSW values associated with the available group members sum to less than 100%, LSW values associated with the remaining available LS group members may first be examined to determine if any of the LSW values are less than their associated MWT thresholds. If so, some or all of those sub-threshold LSW values may be increased to or towards their associated MWT value in an attempt to bring the overall LSW sum for the LS group to 100%. If this LSW adjustment is not sufficient to bring the LSW sum to 100%, then LSW normalization may be performed as described previously.

In an alternate embodiment, if increasing all of the sub-threshold LSW values to or towards their associated MWT value is not sufficient to bring the LSW sum to 100%, then all of the LSW values may be set to their associated MWT threshold limits, and the shortfall from 100% may be added to the LSW of one of the LS group members so as to bring the LSW total for the LS group to 100%. In this manner, all LS group members observe their respective MWT thresholds except one. Selection of the LS group member that is to receive the shortfall weight amount may be based on the number of applications serviced by the member, the MWT of the member, the MCT of the member, or some other performance/operating characteristic associated with the member.

Dynamic Load Sharing Algorithm

Figure 5A:
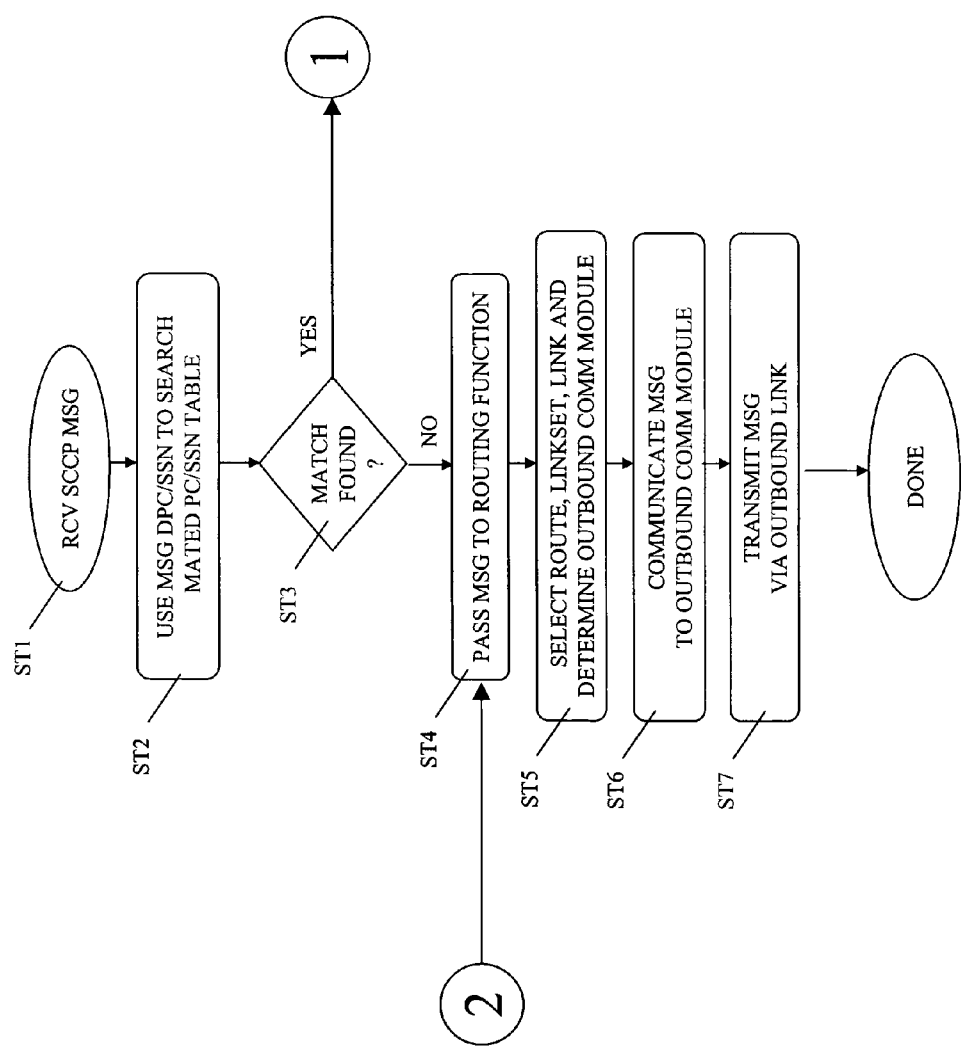
FIGS. 5A, 5B and 5C are a flow chart illustrating exemplary steps that may be associated with the load sharing of a signaling message according to an embodiment of the subject matter described herein.
Figure 5B:
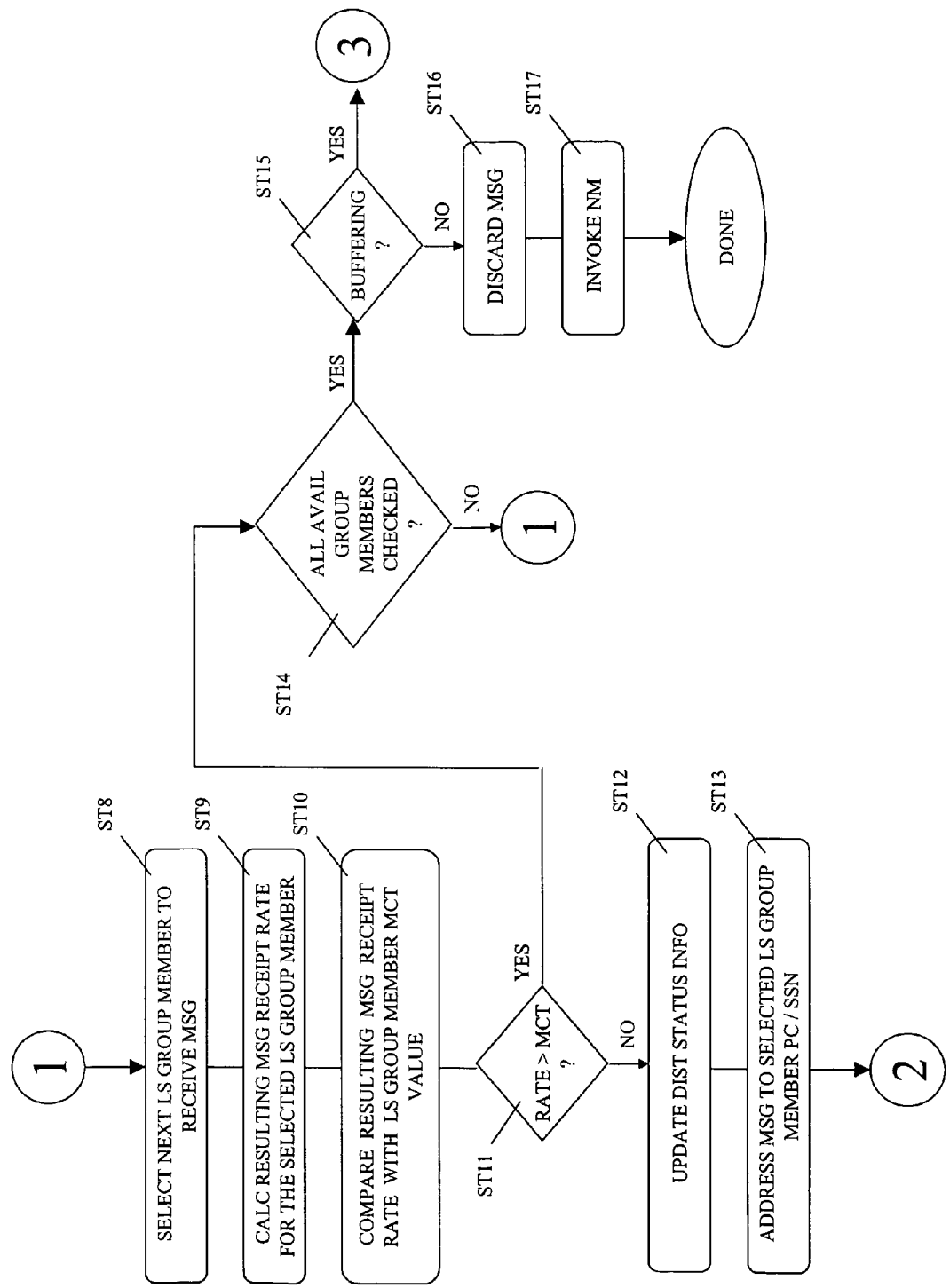
Figure 5C:
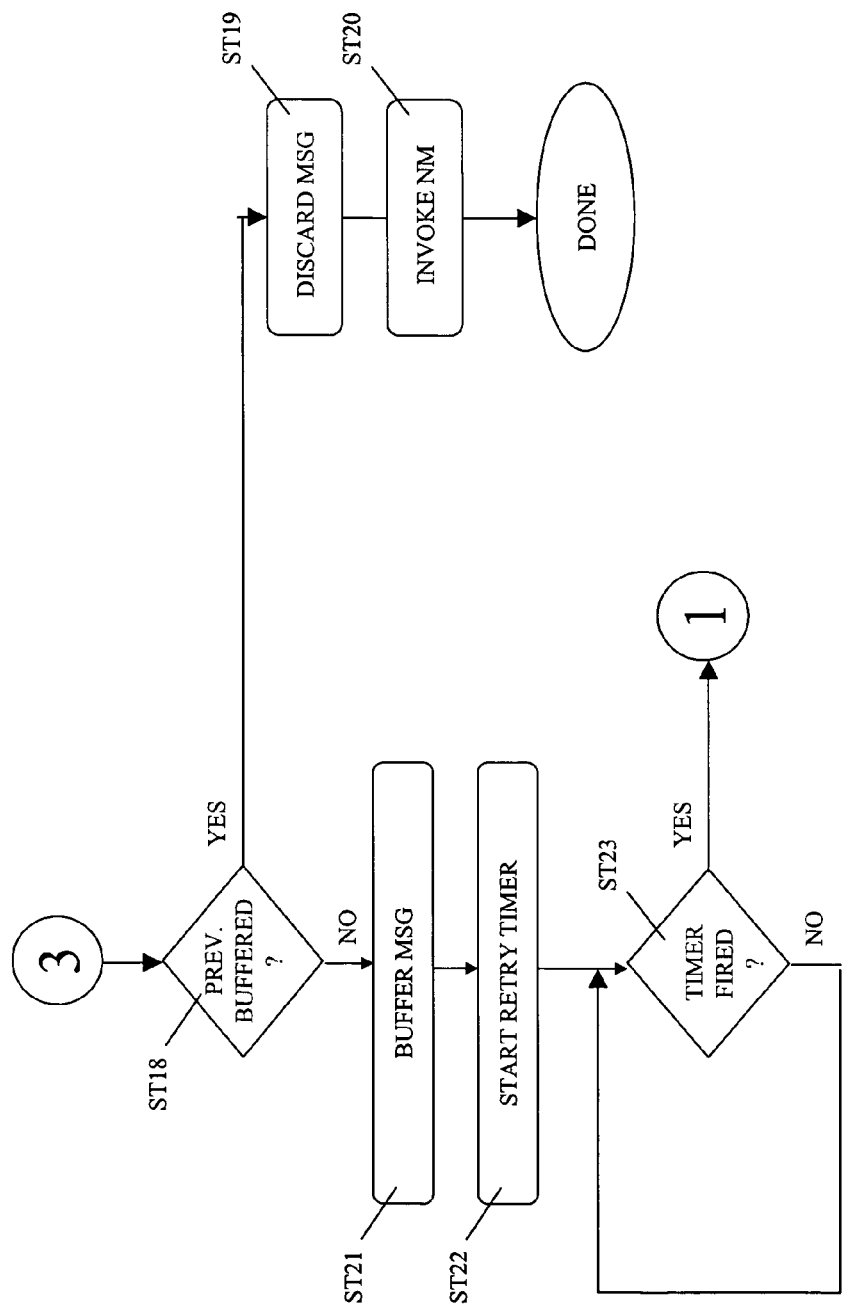

FIGS. 5A-5C depict exemplary processing steps associated with a dynamic load sharing algorithm of the subject matter described herein. Beginning with step ST1 in FIG. 5A, an SCCP signaling message is received by a dynamic load sharing function, such as load sharing function 316 which was previously discussed with respect to SG 300 in FIG. 4. DPC and SSN information is extracted from the received signaling message and used to search a mated PC/SSN data structure (ST2 and ST3), which contains information similar to that presented previously in Tables 5 and 6. If a matching entry is not located in the mated PC/SSN data structure, dynamic load sharing is not provisioned for messages destined for that PC/SSN and the message is passed to routing function 314 (ST4). Routing function 314 is adapted to select an outbound signaling link and associated communication module using MTP information contained in the message (ST5). Routing function 314 is adapted to direct the message to the selected communication module via IMT bus 302 (ST6), where the message is transmitted from the SG via the associated signaling link (ST7).

If a matching entry is located in the mated PC/SSN data structure, LS message allocation information, such as that presented previously in Table 6, is examined to determine which LS group member should receive the message (ST8). The message LS allocation rate that would result from routing the message to the selected LS group member is calculated in step ST9. The calculated or anticipated message LS allocation rate is then compared with the maximum message rate capacity threshold for the selected LS group member (ST10 and ST11). If it is determined that the anticipated message LS allocation rate does not exceed the MCT threshold for the selected LS group member, then load sharing status information is updated, and the message is addressed to the selected LS group member (ST12 and ST13). Load sharing status information may include, but is not limited to, message LS allocation status and message LS allocation rate information similar to that presented previously in Table 6. The appropriately addressed message is then passed to routing function 314, as previously described in step ST4. Routing function 314 is adapted to select an outbound signaling link and associated communication module using the MTP information contained in the message (ST5). Routing function 314 is then adapted to direct the message to the selected communication module via IMT bus 302 (ST6), where the message is transmitted from the SG via the selected outbound signaling link (ST7).

Returning to the decision block at step ST11, if it is determined that the anticipated message LS allocation rate exceeds the MCT threshold for the selected LS group member, then a check is made to determine whether all other LS group members have already been analyzed with respect to receiving the current signaling message (ST14). If not, then the next available member of the LS group is selected, and the process described by steps ST8 through ST14 is repeated until either an LS group member is selected that is capable of receiving the signaling message without exceeding its MCT threshold, or all LS group members have been exhausted. According to one embodiment of the subject matter described herein, in the event of the later condition, a check is made to determine whether message buffering is enabled (ST15). If message buffering is not enabled, then the signaling message is discarded (ST16), and appropriate network management procedures may be invoked (ST17). Network management procedures may include, but are not limited to, the sending of a failure/discard notification message back to the originator of the discarded message. SS7 transfer prohibited (TFP), transfer restricted (TFR), or similar network management messages may also be generated by NM function 318 in response to the discarding of a message.

If message buffering is enabled, then a check is performed to determine whether the signaling message has been previously buffered (ST 18), and if it is determined that the message has been previously buffered then the message is discarded (ST19), and appropriate network management procedures may be invoked (ST20). Once again, network management procedures may include, but are not limited to, the sending of a failure/discard notification message back to the originator of the discarded message, and the generation of SS7 network management messages. If it is determined that the message has not been previously buffered then the message is temporarily stored (ST21) in a random access memory (RAM) buffer that is associated with and accessible by LS function 316. As indicated in step ST22, a retry timer is subsequently started and upon expiration of the timer (ST23), another attempt is made to load share the signaling message in a manner similar to that previously described in steps ST8-ST14.

It will be appreciated that the previous discussion of dynamic load sharing functionality is not limited to post-GTT implementations. The dynamic load sharing algorithms described herein may be applied in a similar manner to other type of signaling message processing applications, including but not limited to, local number portability translation applications, flexible number routing applications, wireless number portability applications, and SIP/SS7 gateway interworking applications. In yet another embodiment of the subject matter described herein, the dynamic load sharing algorithms described herein may be applied to SCCP signaling message traffic that is being MTP routed (i.e., SCCP messages that do not require routing address translation service, such as GTT). In such an embodiment, dynamic load sharing functionality may reside on each communication module, or a DSM-based architecture may be employed.

Dynamic Load Sharing Operation

FIGS. 6 through 11 illustrate operational aspects of an embodiment of the present load sharing invention involving an SG 300 that is adapted to load share signaling message traffic destined to a group of mated signaling destinations following GTT translation processing. SG 300 includes a DSM processing module 310 that is adapted to provide GTT translation service and dynamic load sharing for signaling messages destined for a group of mated SMSC nodes, A-F. Each of the mated SMSC nodes is assigned a unique SS7 point code (PC) address where, SMSC A is assigned PC=1-1-1, SMSC B is assigned PC=1-1-2, SMSC C is assigned PC=1-1-3, SMSC D is assigned PC=1-1-4, SMSC E is assigned PC=1-1-5, and SMSC F is assigned PC=1-1-6.

Figure 6:
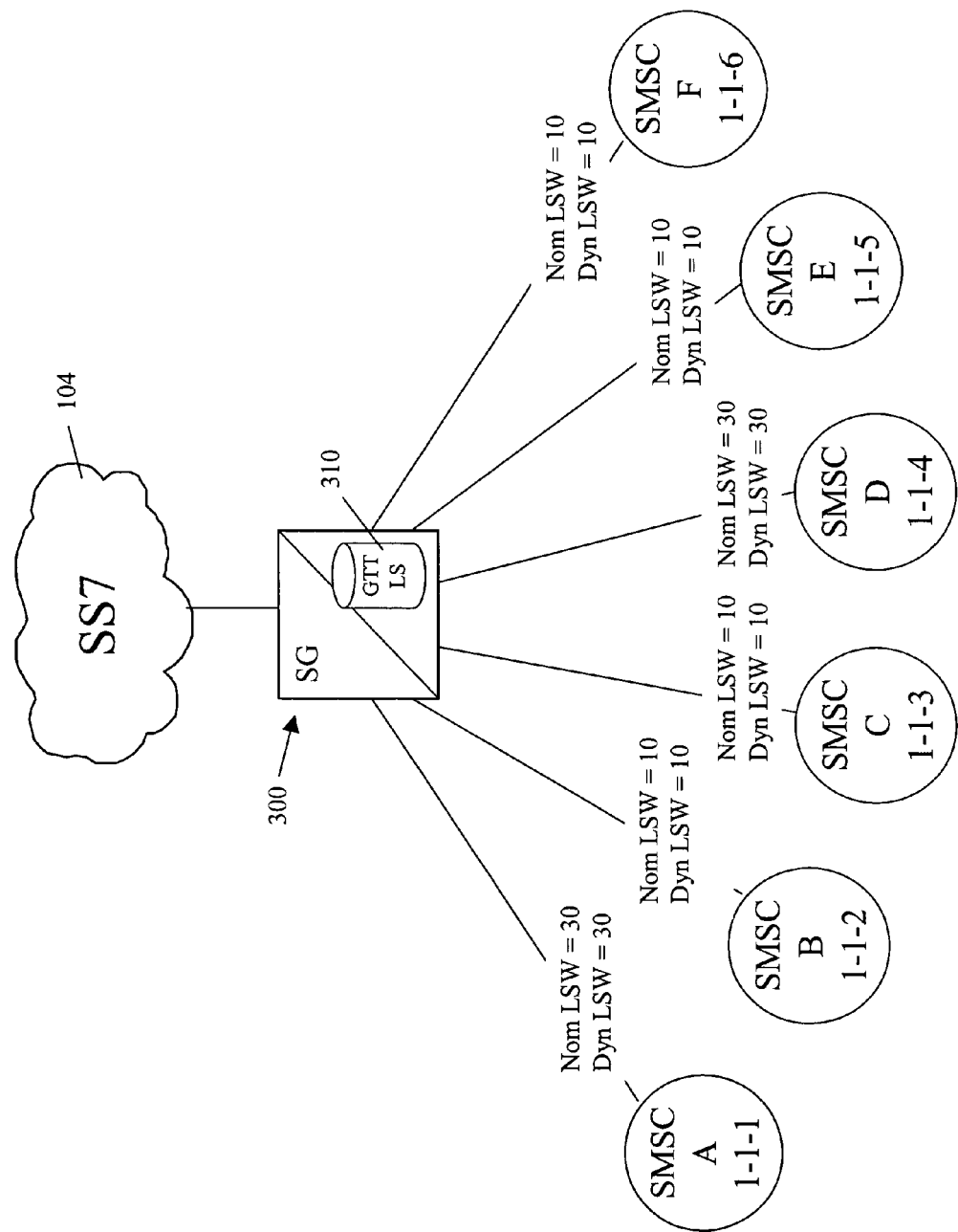
FIG. 6 is a network diagram illustrating a SG routing node according to an embodiment of the subject matter described herein and being configured to load-share signaling messages among a group of mated signaling destinations under normal conditions.

SMSC A is assigned a nominal LSW value of 30%, an MWT of 60%, and an MCT value of 75 msg/sec. SMSC B is assigned a nominal LSW of 10%, an MWT of 40%, and an MCT value of 75 msg/sec. SMSC C is assigned a nominal LSW of 10%, an MWT of 40%, and an MCT value of 75 msg/sec. SMSC D is assigned a nominal LSW of 30%, an MWT of 65%, and an MCT value of 75 msg/sec. SMSC E is assigned a nominal LSW of 10%, an MWT of 20%, and an MCT value of 50 msg/sec. SMSC F is assigned a nominal LSW of 10%, an MWT of 30%, and an MCT value of 50 msg/sec. Therefore, under nominal operating conditions, 100% of the signaling message traffic destined for the mated SMSC load sharing group will be distributed among the members of the group according to the assigned LSW values, and no messages will be discarded. A nominal operating condition scenario is illustrated in FIG. 6.

Figure 7:
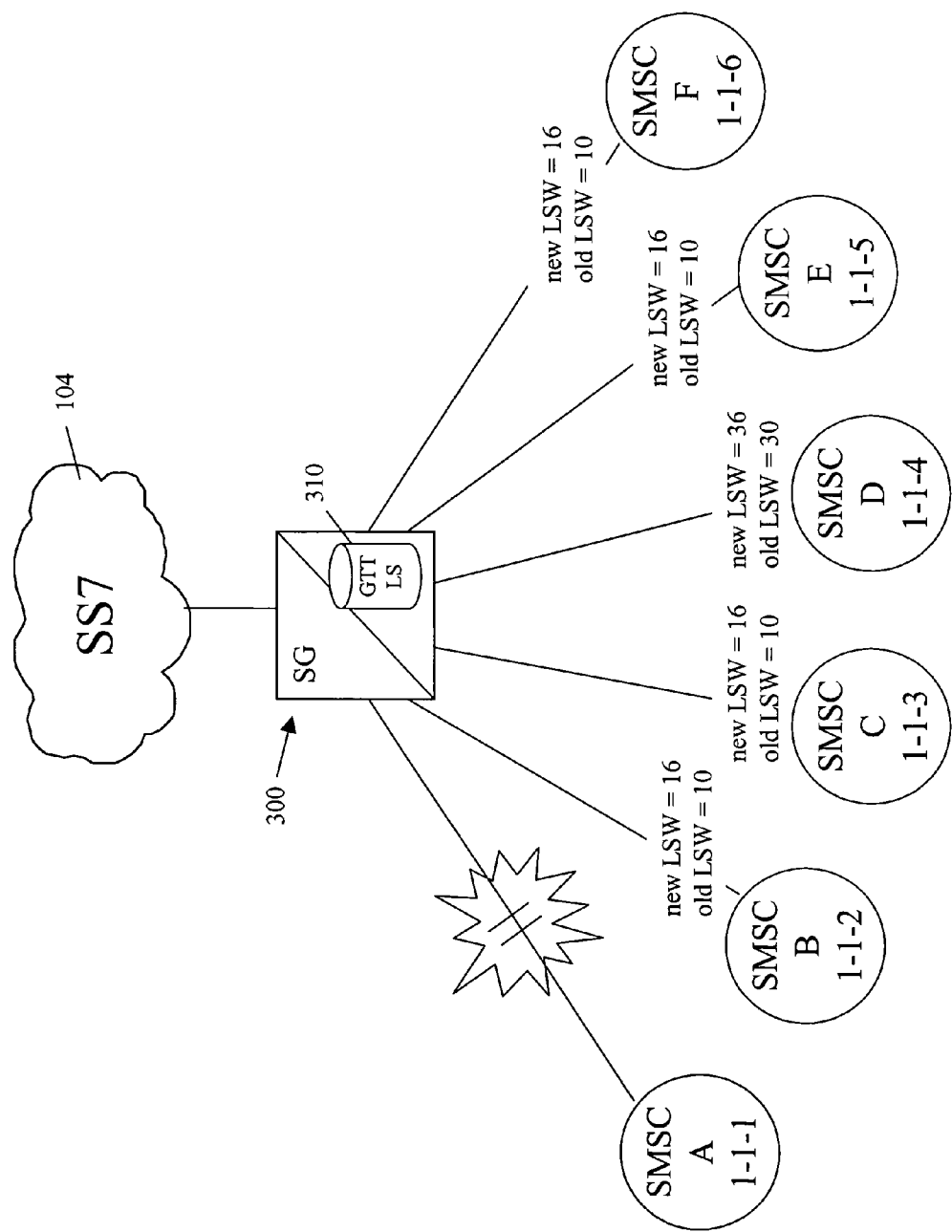
FIG. 7 is a network diagram illustrating a SG routing node according to an embodiment of the subject matter described herein and being configured to load-share signaling messages among a group of mated signaling destinations where one of the destinations is unavailable.

FIG. 7 illustrates a scenario where SMSC A becomes unavailable. In this case, the dynamic load sharing weights associated with each of the remaining LS group members (i.e., SMSC B-F) are recalculated according to the LSW adjustment algorithm described in FIGS. 4A and 4B. The resulting LSW delta caused by the loss of SMSC A is 6% (i.e., 30%/5 group members=6%). The 6% delta is added to each of the remaining available LS group members to produce a new set of dynamic LSW values.

Figure 8:
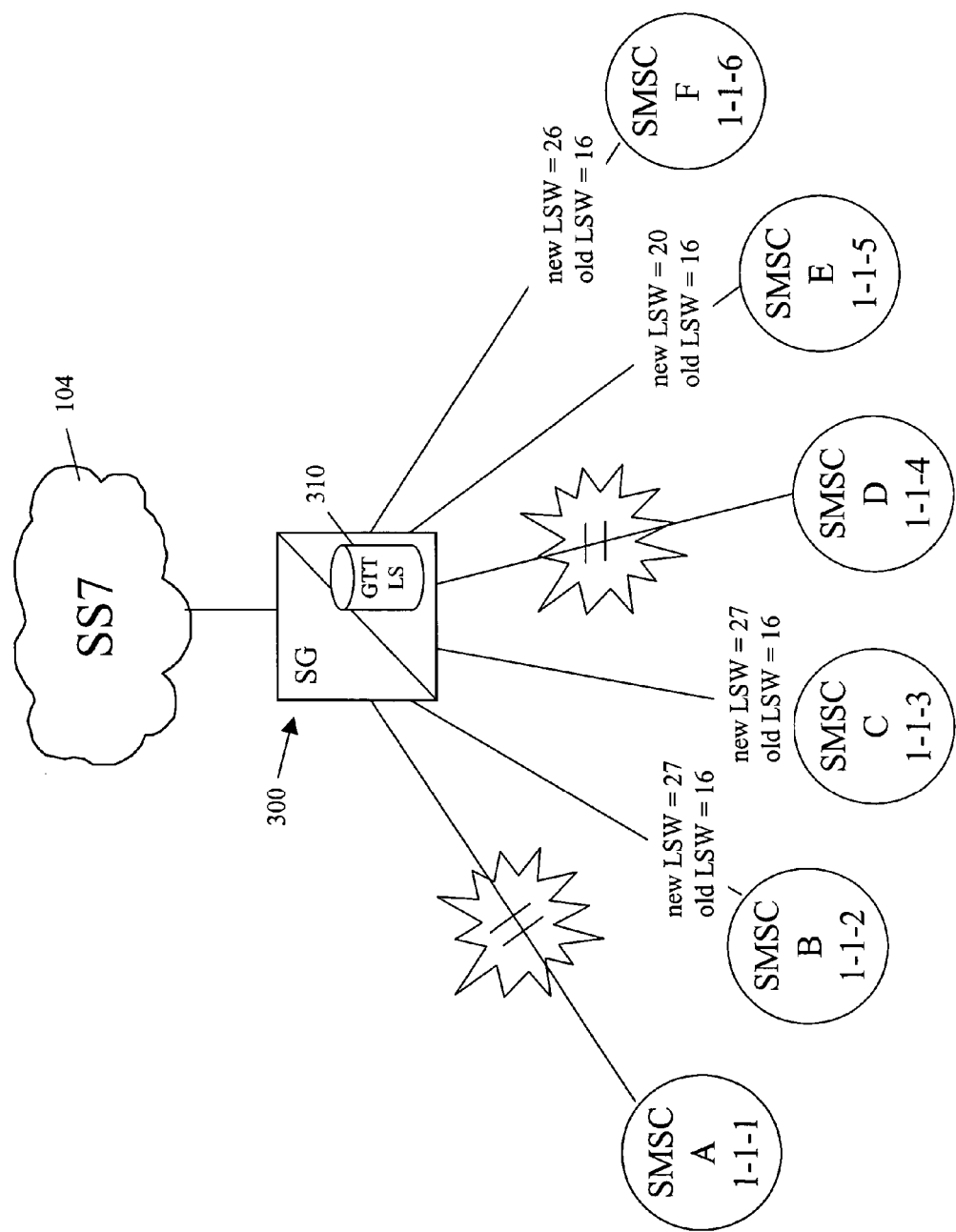
FIG. 8 is a network diagram illustrating a SG routing node according to an embodiment of the subject matter described herein and being configured to load-share signaling messages among a group of mated signaling destinations when two of the destinations are unavailable.

Illustrated in FIG. 8 is a continuation of the above scenario where SMSC D also subsequently becomes unavailable. In this case, the dynamic load sharing weights associated with each of the remaining LS group members (i.e., SMSC B, C, E and F) are again recalculated. The resulting LSW delta caused by the loss of SMSC D is 9% (i.e., 36%/4 group members=9%). However, when this delta is added to each of the remaining available LS group members, it will be appreciated from the MWT threshold information presented in Table 5 that the MWT threshold for SMSC E (i.e., MWT=20%) would be exceeded by the additional 9% load. That is, SMSC E's existing dynamic LSW value of 16% plus the 9% delta equals 25%, which is 5% higher than the MWT threshold value of 20%. Consequently, the dynamic LSW for SMSC E is set to the MWT value of 20%, and the 5% delta is distributed among the remaining 3 available LS group members. In this case, 2% is added to the LSW of SMSC B, 2% is added to the LSW of SMSC C, and 1% is added to the LSW of SMSC F. The resulting LSW values for SMSC B, C, and F do not exceed their corresponding MWT thresholds and the total LSW values for the LS group sum to 100%.

Figure 9:
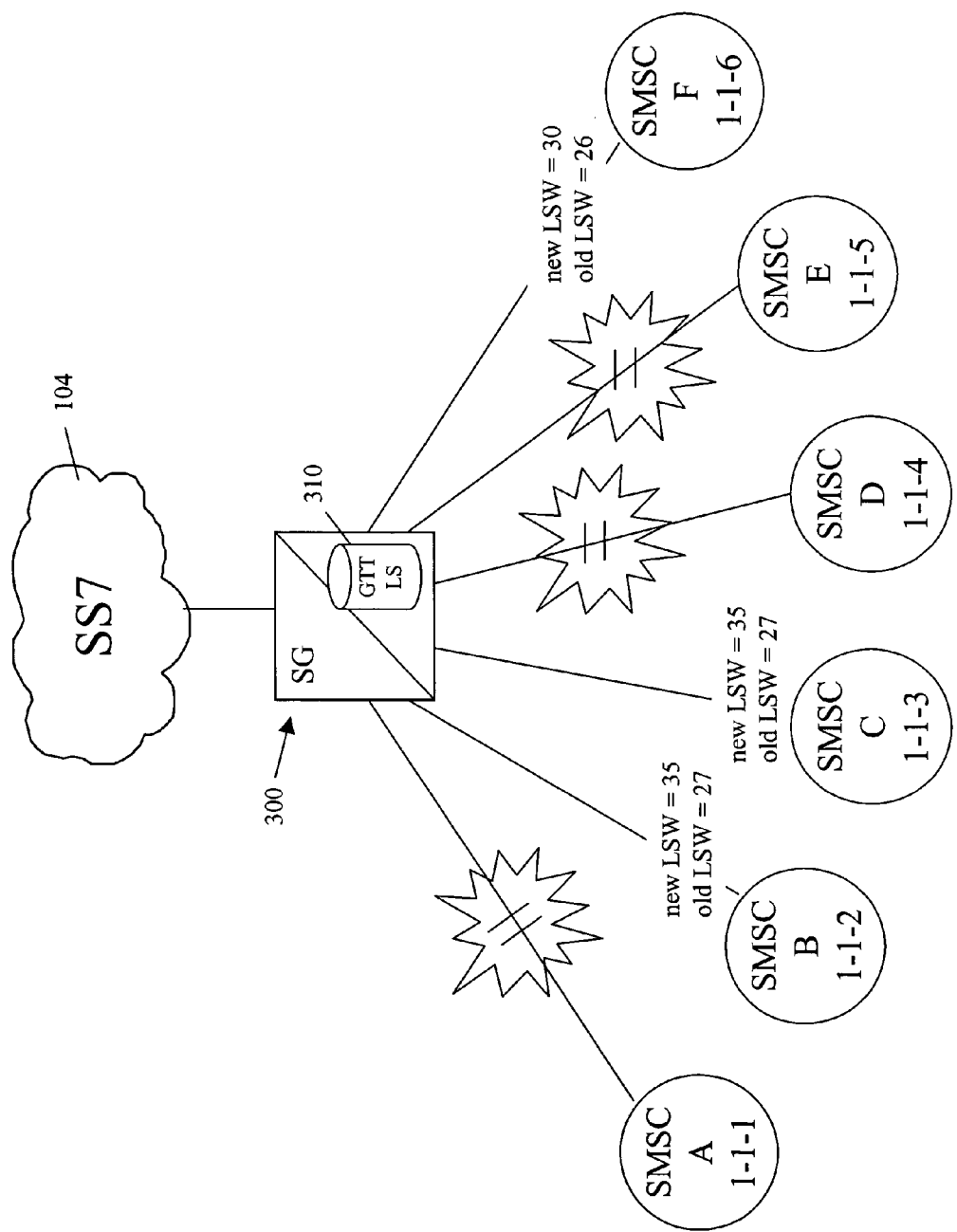
FIG. 9 is a network diagram illustrating a SG routing node according to an embodiment of the subject matter described herein and being configured to load-share signaling messages among a group of mated signaling destinations when three of the destinations are unavailable.

Illustrated in FIG. 9 is a continuation of the above scenario where SMSC E also subsequently becomes unavailable. In this case, the dynamic load sharing weights associated with each of the remaining available LS group members (i.e., SMSC B, C and F) are again recalculated. The resulting LSW delta caused by the loss of SMSC E is approximately 7% (i.e., 20% divided by 3 group members=6.33%). However, once again, when this delta is added to each of the remaining available LS group members, the MWT threshold for SMSC F (i.e., MWT=30%) would be exceeded due to the additional 6.33% load. That is, SMSC F's existing dynamic LSW value of 26% plus the 6.33% delta equals 32.33%, which is 2.33% higher than the MWT threshold value of 30%. Consequently, the dynamic LSW for SMSC F is set to the MWT value of 30%, and the 2.33% delta is distributed among the remaining 2 available LS group members. In this case, 8% is added to the LSW of SMSC B and 8% is added to the LSW of SMSC C. The resulting LSW values for SMSC B, C, and F do not exceed their corresponding MWT thresholds and the total LSW values for the LS group sum to 100%. It will be appreciated that in the case where an LSW delta value resolves to a number with fractional component, such as in the example presented above where the average LSW delta is equal to 20% divided by 3 group members=6.33% per group member, the delta may alternatively be calculated in integer terms on a per-member basis. For example, instead of an average LSW delta of 6.33%, the LSW deltas may be represented as a group member 1 delta of 6%, a group member 2 delta of 7%, and a group member 3 delta of 7%.

Figure 10:
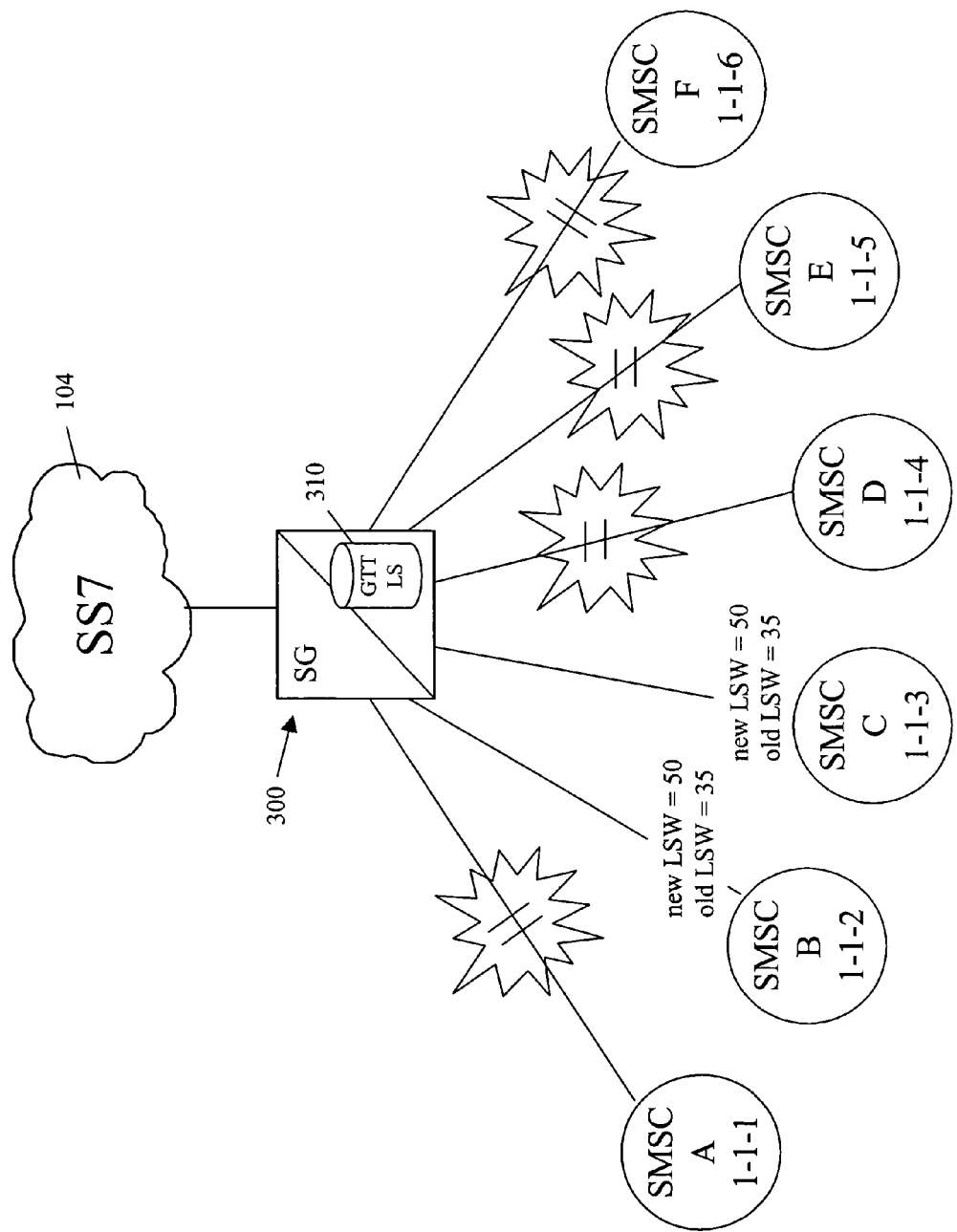
FIG. 10 is a network diagram illustrating a SG routing node according to an embodiment of the subject matter described herein and being configured to load-share signaling messages among a group of mated signaling destinations when four of the destinations are unavailable.

Illustrated in FIG. 10 is a continuation of the above scenario where SMSC F also subsequently becomes unavailable. In this case, the dynamic load sharing weights associated with each of the remaining available LS group members (i.e., SMSC B and C) are again recalculated. The resulting LSW delta caused by the loss of SMSC F is approximately 15% (i.e., 30% divided by 2 group members=15%). However, once again, when this delta is added to each of the remaining available LS group members, the MWT threshold for SMSC B (i.e., MWT=40%) would be exceeded due to the additional 15% load. A similar result is observed with respect to SMSC C. In this case, if the dynamic LSW values for SMSC B and C are set to their respective MWT threshold values of 40%, then the total LSW percentage distributed between the two destinations would only be 80%. In this case, SMSC B's dynamic LSW is set to the associated MWT threshold value of 40%, and similarly SMSC C's dynamic LSW is set to the associated the MWT threshold value of 40%. It will be appreciated that under light to moderate message traffic loads, it would be inefficient to load share 80% of the received messages and automatically discard the remaining 20%. For example, consider the hypothetical scenario where 100 messages are received by SG 300 in a 1 second period that are GTT translated and destined for the LS group comprising available members SMSC B and C. Forty percent (i.e., 40) of the received messages would be directed to SMSC B, 40% (i.e., 40) of the received messages would be directed to SMSC C, and 20% (i.e., 20) of the received messages would be discarded. From the exemplary data presented previously in Tables 5 and 6, it will be appreciated that the maximum message receipt rate capacity of both SMSC B and SMSC C is 75 msg/sec. Consequently, in this hypothetical scenario, 20 messages would be discarded even though SMSC B and SMSC C have the available capacity to handle the additional 20 messages.

To address this potential inefficiency, the MWT threshold-limited LSW values for SMSC B and C are subsequently normalized to yield an LSW sum of 100%. The normalized LSW for SMSC B is calculated as 40%/(40%+40%)=50%. A similar normalization calculation yields a new dynamic LSW of 50% for SMSC C. In this manner, a "best effort" is made to load share all signaling message traffic in response to sub-nominal operating conditions. From this point on, signaling message traffic is discarded only if the MCT thresholds of the load sharing destinations are exceeded.

Figure 11:
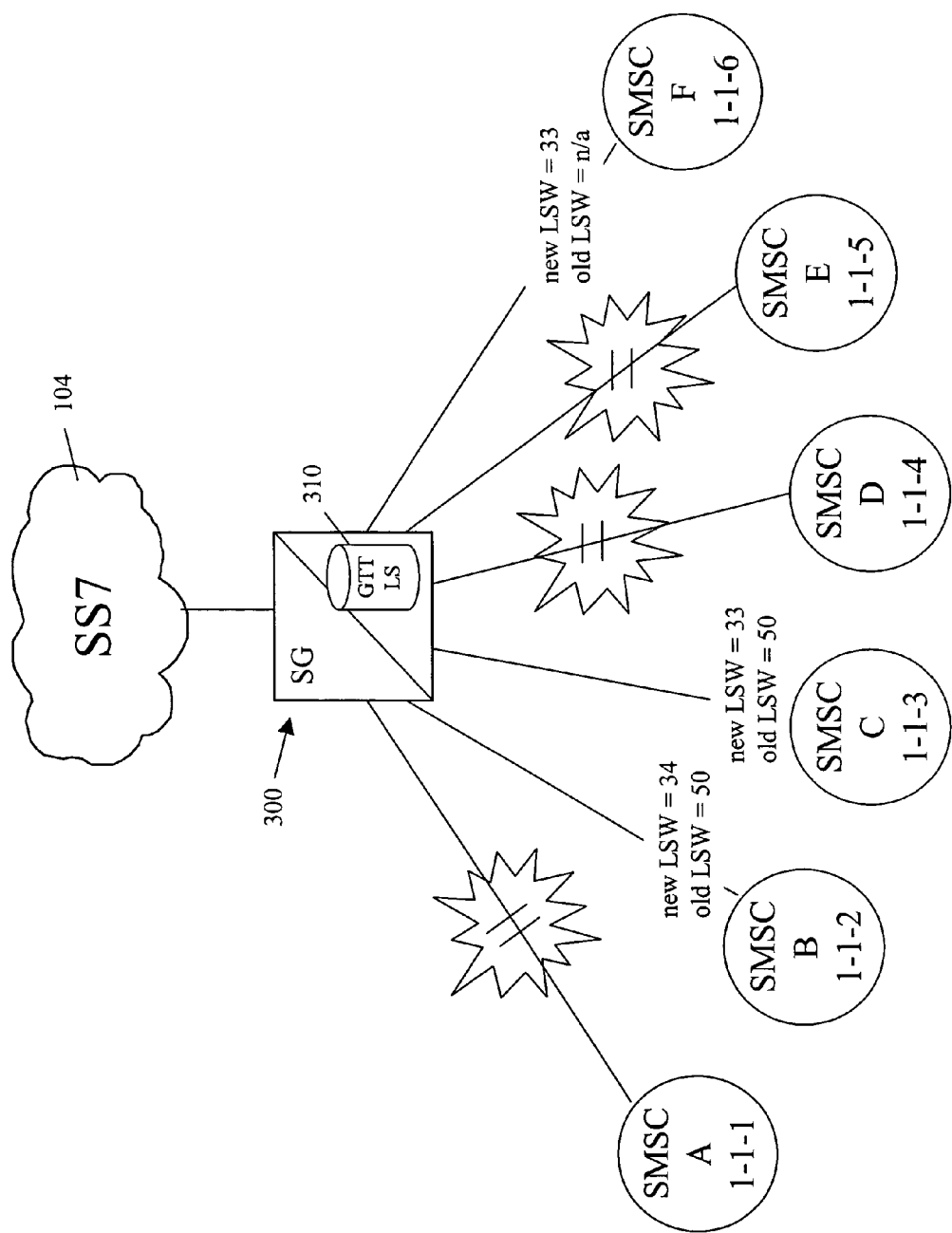
FIG. 11 is a network diagram illustrating a SG routing node according to an embodiment of the subject matter described herein and being configured to load-share signaling messages among a group of mated signaling destinations when one of the destinations that was unavailable in FIG. 10 becomes available.
Figure 12:
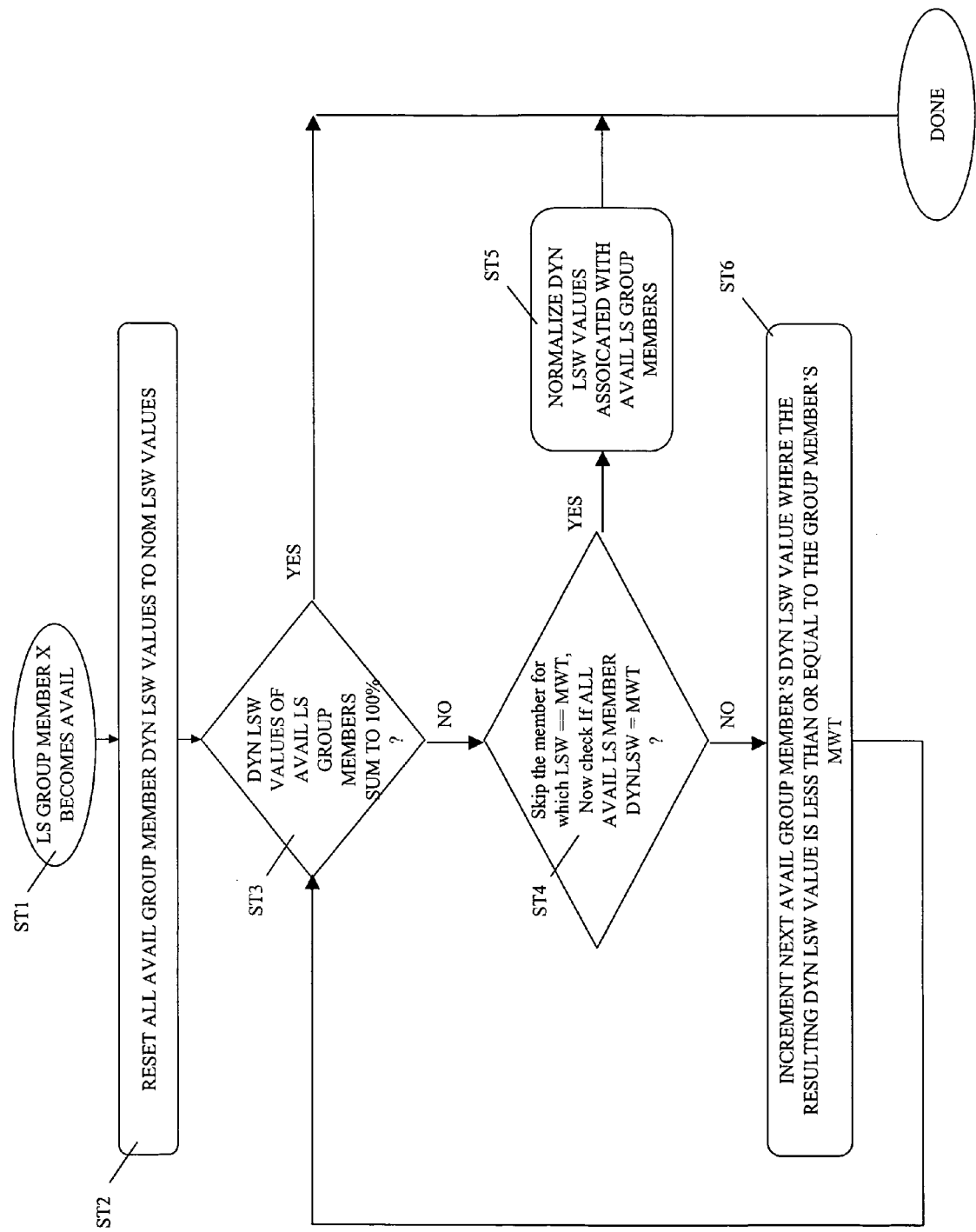
FIG. 12 is a flow chart illustrating exemplary steps that may be associated with the modification of load sharing weight values in response to signaling destination availability according to an embodiment of the subject matter described herein.

FIG. 11 illustrates a scenario that involves a previously unavailable signaling destination, which becomes available once again. While FIGS. 6 through 10 depict incremental LSW adjustments in response to a compounding signaling destination failure scenario, FIG. 11 illustrates an exemplary LSW adjustment in response to the "re-appearance" of a previously unavailable signaling destination. A process flow chart diagram presented in FIG. 12 may be used in conjunction with FIG. 11 to better understand the associated LSW weight adjustments. Beginning with the operating scenario previously presented in FIG. 10, SMSC F becomes available (ST1), thereby making SMSC B, C and F available members of the load sharing group. In step ST2, each of the available LS group member dynamic LSW values is reset to the associated nominal LSW value. That is SMSC B dynamic LSW is reset to 10%, SMSC C dynamic LSW is reset to 10%, and SMSC F dynamic LSW is reset to 10%. (See Table 5).

A check is then performed to determine whether the new dynamic LSW values sum to 100%, as indicated in step ST3. In this case, the dynamic LSW values associated with the three available SMSC destinations sum to 30%. If the new dynamic LSW values sum to 100%, then no further LSW adjustment is made. If the new dynamic LSW values sum to less than 100%, which is the case in this example, then a check is performed to determine whether the dynamic LSW values for all of the available LS group members are at their MWT limits (ST4).

If the dynamic LSW values for all of the available LS group members are at their MWT limits, then the dynamic LSW values may be normalized in a manner similar to that described previously in this disclosure (ST5). If the dynamic LSW values for all of the available LS group members are not at their MWT limits, which is the case in this example, then the dynamic LSW value associated with the next available LS group member is incremented provided that the resulting new dynamic LSW value does not exceed the associated MWT threshold (ST6). In this example, the dynamic LSW associated with SMSC B is incremented to 11%. Once the new dynamic LSW is generated, processing returns to step ST3, and LSW increment loop continues until the dynamic LSW values associated with all of the available LS group members sum to 100% or one of the associated MWT threshold is exceeded. In this example, the LSW increment loop stops when the dynamic LSW of SMSC F is incremented to 30%. SMSC F is skipped from the redistribution of load here on till the rest of the group members are reached to their MWT thresholds or a total dynamic LSW summation of 100% is reached (ST4). SMSC F could be involved in redistribution if the sum of all LSW is less than 100%, as part of normalization process (ST5). B is incremented to 35%, thereby yielding a total dynamic LSW summation of 100% (i.e., SMSC C dyn LSW=35%, SMSC F dyn LSW=30%). Alternatively, the weight reassignment could be based on previously described algorithm (i.e. After all the available group members are reset to their respective associated nominal LSW values, the redistribution is based on factor of remaining load vs. number of available group members.), thereby Resulting in initial LSW of 10%, 10% and 10% for SMSC B, C and F respectively. The remaining 70% of load is then redistributed between these three SMSC's. Consideration is again given to MWT thresholds, and so the new dynamic LSW for SMSC F will be 30% resulting in LSW of 30% for SMSC B and 30% for SMSC C. Now the summation of LSW of all available SMSCs is 90% (i.e. less than 100%), and SMSC B and SMSC C are still not at their MWT threshold, so the remaining 10% is redistributed between SMSC B and SMSC C, resulting in LSW of 35% for SMSC B and LSW of 35% for SMSC C.

Thresholded Load Sharing to IP Signaling Points

The subject matter described herein may also be used to load share signaling messages that are destined to signaling points in an IP network. As such, it will be appreciated that a load sharing group according to one embodiment of the subject matter described herein may include one or more members that reside in an IP network. As such, signaling messages destined for a PC/SSN which is designated as a member of a load sharing group may be distributed to an IP signaling destination using dynamic load sharing algorithms that are similar to those described in detail previously with respect to SS7 signaling destinations.

to a load sharing group that is comprised of multiple load sharing IP destinations. Signaling message traffic is then load shared between the available members of the IP load sharing group in a manner that is similar to that previously described.

TABLE 8

IP Load Sharing Metrics

| PC | SSN | Remote IP | Dyn LSW | Message LS Allocation Status | MCT | Message LS Allocation Rate |
|---|---|---|---|---|---|---|
| 1-1-1 | 12 | 1.1.1.1 | 30 | 11 | 75 | 40 |
| 1-1-1 | 12 | 1.1.1.2 | 60 | 10 | 75 | 20 |
| 1-1-1 | 12 | 1.1.1.3 | 10 | 10 | 75 | 20 |

Exemplary IP-based load sharing metrics are presented in Table 8, which is similar in form and function to the load sharing metric information previously discussed with respect to Table 6.

Figure 13:
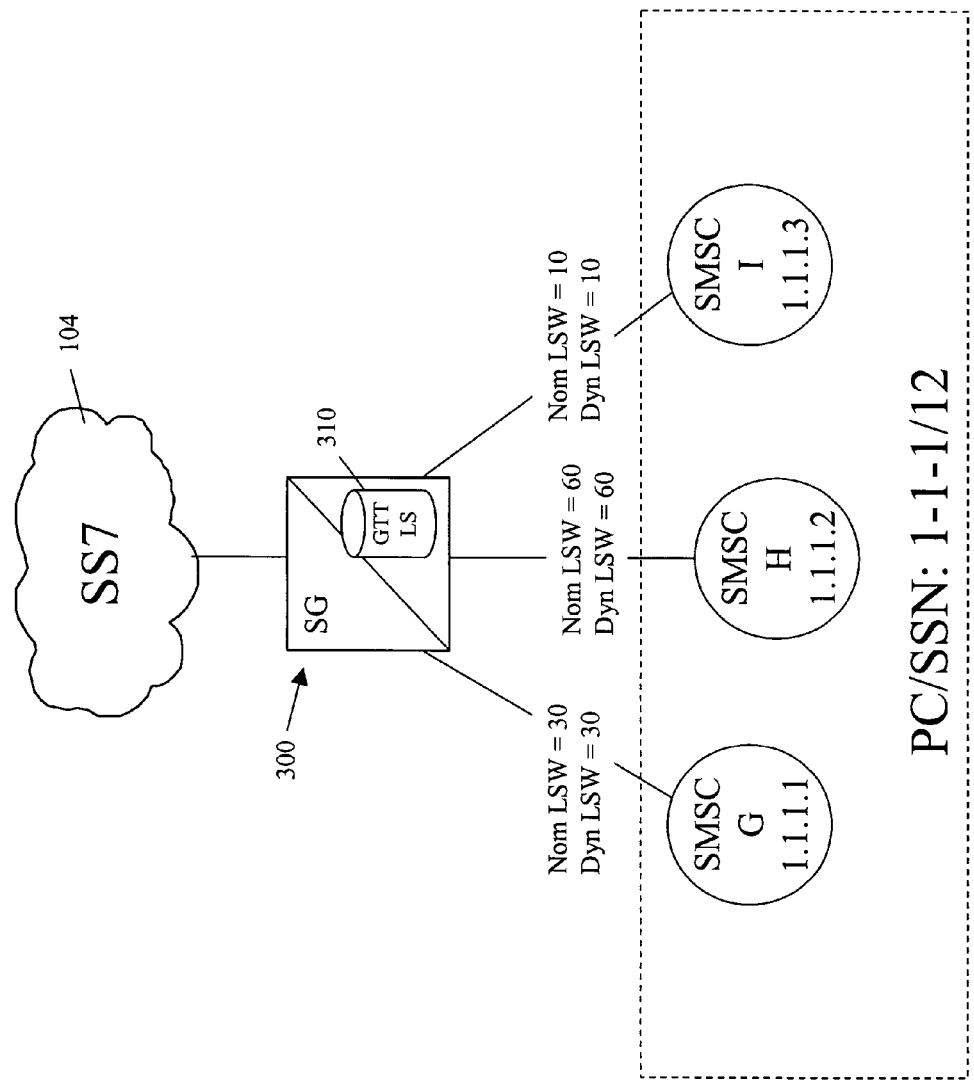
FIG. 13 is a network diagram illustrating a SG routing node according to an embodiment of the subject matter described herein and being configured to load share signaling messages among a group of mated Internet protocol (IP) signaling destinations where the IP destinations share the same signaling system 7 (SS7) network address.

FIG. 13 illustrates one embodiment of the dynamic load sharing invention, which includes SS7/IP SG 300 and three IP network-based SMSC signaling points, SMSC G-I. In one exemplary signaling scenario, an SS7 SCCP signaling message is received at SG 300 and is internally directed to DSM 310 in a manner similar to that described previously. GTT translation is performed on the message with a resulting destination address of PC: 1-1-1 SSN:12, and the message is subsequently processed by LS function 316. LS function 316 searches mated destination information such as that contained in Table 7, and locates a LS group with several matching entries. The next available IP signaling destination that is a member of the LS group is selected using a dynamic load sharing algorithm that is similar to that previously described. The message is passed to routing function 314, which directs the message to a DCM communication module, such as DCM 306, that is servicing the selected IP destination. The DCM module may adapt the SS7 SCCP signaling message for transmission to the IP destination. Adaptation may include encapsulation or translation to another signaling protocol

TABLE 7

Mated IP Destinations

| PC | SSN | IP | Status | LS Grp | LS Mode | Nom LSW | Dyn LSW | MWT | MCT |
|---|---|---|---|---|---|---|---|---|---|
| 1-1-1 | 12 | 1.1.1.1 | Avail | LSG1 | WP | 30 | 30 | 60 | 75 |
| 1-1-1 | 12 | 1.1.1.2 | Avail | LSG1 | WP | 60 | 60 | 70 | 75 |
| 1-1-1 | 12 | 1.1.1.3 | Avail | LSG1 | WP | 10 | 10 | 40 | 75 |

An SS7 (or IETF SIGTRAN) signaling message may be GTT translated to a destination address that corresponds to an IP signaling destination. That is, the destination address resulting from the GTT translation may include SS7 PC and SSN identifiers which are associated with one or more IP signaling point destinations. Presented in Table 7 is exemplary mated IP signaling destination information, which is similar in nature and function to the mated PC/SSN information presented previously with respect to Table 5. The key difference between the Table 5 and Table 7 information is the inclusion of an IP destination address field in Table 7. It will be appreciated that remote IP port information may also be included in Table 7.

As illustrated with the exemplary data in Table 7, a single SS7 destination address (e.g., PC, PC/SSN) may be mapped such as IETF SIGTRAN SCCP user adaptation layer (SUA), SIP, H.323, etc. A discussion of such SS7-to-IP adaptation of SS7 SCCP-based signaling messages at a network routing node can be found in U.S. Pat. No. 6,324,183, which is incorporated herein by reference in its entirety. Once again, dynamic load sharing algorithms of the subject matter described herein may be implemented on an application processor, such as DSM 310, or alternatively on a communication module, such as DCM 306.

In any event, signaling messages may be load shared among members of a predefined load sharing group that is comprised of SS7 signaling destinations, IP signaling destinations, or a combination of both using a dynamic load sharing algorithm of the subject matter described herein. In response to changes in network operating conditions, the dynamic load sharing algorithm is adapted to modify load sharing distribution weights in a manner similar to that previously described with respect to a pure SS7 implementation.

It will be appreciated that various details of the invention may be changed without departing from the scope of the invention. Furthermore, the foregoing description is for the purpose of illustration only, and not for the purpose of limitation—the invention being defined by the claims.

What is claimed is:

1. A method for dynamically load sharing signaling messages among mated signaling destinations in response to changes in network operating conditions, the method comprising:
  (a) defining a group of signaling destinations as a load sharing (LS) group, wherein defining a group of signaling destinations as a load sharing group includes provisioning a data structure such that post-global-title translated (post-GTT) signaling message traffic is assigned to a load sharing group based on the post-GTT destination point code in each message;
  (b) assigning each member of the LS group a nominal load sharing weight (LSW) and a maximum load sharing weight threshold (MWT);
  (c) in response to a LS group member becoming unavailable to receive signaling message traffic, distributing the LSW associated with the unavailable member among the remaining available members in a manner such that the MWT thresholds associated with each of the remaining available members are not exceeded, wherein distributing the LSW among the remaining available members includes dynamically altering relative load sharing weights assigned to entries in the data structure corresponding to the remaining unavailable members of the load sharing group; and
  (d) load sharing post-GTT signaling message traffic destined for a member of the LS group in accordance with each available group member's dynamically altered LSW.

2. The method of claim 1 wherein defining a group of signaling destinations as a LS group includes defining a group of signaling system 7 (SS7) signaling points as a LS group.

3. The method of claim 2 wherein defining a group of SS7 signaling points as a LS group includes defining a group of SS7 service control points.

4. The method of claim 1 wherein defining a group of signaling destinations as a LS group includes defining a group of Internet protocol (IP)-based signaling destinations.

5. The method of claim 1 wherein each nominal LSW is expressed as a percentage of signaling message traffic.

6. The method of claim 1 wherein each MWT is expressed as a percentage of signaling message traffic.

7. The method of claim I comprising determining whether load sharing a signaling message to a member of the LS group will exceed a maximum message rate receipt capacity threshold (MCT) associated with the member, and in response to determining that load sharing a received signaling message to a member of the LS group will exceed the (MCT) associated with the member, attempting to load share the message to another member of the LS group.

8. The method of claim 7 wherein attempting to load share the message includes determining whether other members of the LS group can receive the message without exceeding their MCTs, and in response to determining that no other members of the LS group can receive the message without exceeding their MCTs thresholds, buffering the message.

9. The method of claim 7 wherein attempting to load share the message includes determining whether other members of the LS group can receive the message without exceeding their MCTs, and in response to determining that no other members of the LS group can receive the message without exceeding their associated MCT thresholds, discarding the message.

10. The method of claim 9 comprising generating a network management message associated with discarding of the message.

11. The method of claim 1 wherein the received signaling message traffic includes SS7 signaling connection control part (SCCP) message traffic.

12. The method of claim 1 wherein the received signaling message traffic includes Internet Engineering Task Force (IETF) SIGTRAN SCOP user adaptation layer (SUA) message traffic.

13. The method of claim 1 wherein steps (a)-(d) are performed at a network routing node.

14. The method of claim 13 wherein the network routing node comprises an 557 signal transfer point.

15. The method of claim 13 wherein the network routing node comprises an SS7/IP signaling gateway.

16. The method of claim 1 wherein load sharing the signaling message traffic includes load sharing the signaling message traffic after performing global title translation for the signaling message traffic.

17. The method of claim 1 comprising, in response to a LS group member becoming available to receive signaling message traffic, resetting the LSW values of the available members to their nominal LSW values.

18. A method for dynamically load sharing signaling messages among mated signaling destinations in response to changes in network operating conditions, the method comprising:
  (a) defining a group of signaling destinations as a load sharing (LS) group;
  (b) assigning each member of the LS group a nominal load sharing weight (LSW) and a maximum load sharing weight threshold (MWT);
  (c) in response to a LS group member becoming unavailable to receive signaling message traffic, distributing the LSW associated with the unavailable member among the remaining available members in a manner such that the MWT thresholds associated with each of the remaining available members are not exceeded; and
  (d) load sharing received signaling message traffic destined for a member of the LS group in accordance with each available group member's LSW, comprising determining whether the sum of available LS group member LSW values is less than 100%, and, in response to determining that the sum of the available LS group member LSW values is less than 100%, normalizing the LSW values associated with the available group members.

19. A method for dynamically load sharing signaling messages among mated signaling destinations in response to changes in network operating conditions, the method comprising:
  (a) defining a group of signaling destinations as a load sharing (LS) group;
  (b) assigning each member of the LS group a nominal load sharing weight (LSW) and a maximum load sharing weight threshold (MWT);
  (c) in response to a LS group member becoming unavailable to receive signaling message traffic, distributing the LSW associated with the unavailable member among the remaining available members in a manner such that the MWT thresholds associated with each of the remaining available members are not exceeded; and (d) load sharing received signaling message traffic destined for a member of the LS group in accordance with each available group member's LSW, wherein the received signaling message traffic includes session initiation protocol (SIP) message traffic.

20. A method for dynamically load sharing signaling messages among mated signaling destinations in response to changes in network operating conditions, the method comprising:
   (a) defining a group of signaling destinations as a load sharing (LS) group;
   (b) assigning each member of the LS group a nominal load sharing weight (LSW) and a maximum load sharing weight threshold (MWT);
   (c) in response to a LS group member becoming unavailable to receive signaling message traffic, distributing the LSW associated with the unavailable member among the remaining available members in a manner such that the MWT thresholds associated with each of the remaining available members are not exceeded; and
   (d) load sharing received signaling message traffic destined for a member of the LS group in accordance with each available group member's LSW, in response to a LS group member becoming available to receive signaling message traffic, resetting the LSW values of the available members to their nominal LSW values, and in response to determining that the sum of the LSW values is less than 100%, increasing the LSW values in a manner such that the MWT thresholds associated with each of the available members are not exceeded.

21. A system for load sharing signaling messages and dynamically adjusting load sharing distribution weights in response to changes in network operating conditions, the system comprising:
   (a) a first communications module for receiving a signaling message and for identifying a post-global-title translation (post-GTT) signaling destination, which is a member of a load sharing group, wherein the first communication module includes a data structure such that post-global-title-translated signaling traffic is assigned to a load sharing group based on the post-GTT destination point code in each message;
   (b) a load sharing function located on the first communications module and for:
      (i) maintaining load sharing weight (LSW) assignment information for each member of the load sharing group;
      (ii) maintaining maximum load sharing weight threshold (MWT) information for each member of the load sharing group;
      (iii) dynamically adjusting LSW assignments in response to a change in availability status of a group member such that the resulting LSW for each available group member does not exceed the associated MWT for each member, wherein dynamically adjusting the LSW assignments includes dynamically altering relative load sharing weights assigned to entries in the data structure corresponding to the remaining available members of the load sharing group; and
      (iv) selecting a member of the load sharing group to receive the signaling message using the dynamically altered LSW assignments; and
   (c) a second communications module for receiving the signaling message from the first communications module and for communicating the signaling message to the selected member of the load sharing group.

22. The system of claim 21 wherein the first and second communications modules and the load sharing function are components of a network routing node.

23. The system of claim 22 wherein the network routing node comprises a signaling system 7 (SS7) signal transfer point.

24. The system of claim 22 wherein the network routing node comprises an SS7/Internet protocol (IP) signaling gateway.

25. The system of claim 24 wherein the load sharing function is adapted to communicate the signaling message to the first communications module and wherein the first communications module is adapted to communicate the signaling message to the selected member of the load sharing group.

26. The system of claim 21 wherein the first communications module comprises an SS7 link interface module.

27. The system of claim 21 wherein the second communications module comprises an SS7/IP data communication module.

28. The system of claim 21 wherein the signaling destination comprises an SS7 signaling point.

29. The system of claim 21 wherein the signaling destination comprises an IP-based signaling point.

30. The system of claim 29 where the IP-based signaling points that comprise the load sharing group share the same SS7 network address.

31. The system of claim 21 comprising a database services module operatively associated with the first communications module, wherein the load sharing function resides on a the database services module.

32. The system of claim 21 where the load sharing function resides on the first communications module.

33. The system of claim 21 wherein the load sharing function resides on the second communications module.

34. The system of claim 21 wherein the load sharing function is adapted to determine whether load sharing a received signaling message to a member of the LS group will exceed a maximum message receipt rate capacity threshold (MCT) associated with the member, and in response to determining that the MCT for the member will be exceeded, the load sharing function is adapted to attempt to load share the message to another member of the LS group.

35. The system of claim 34 wherein the load sharing function, in response to determining that no other members of the LS group can receive the message without exceeding their associated MOT thresholds, is adapted to buffer the message.

36. The system of claim 21 wherein the load sharing function, in response to determining that a LS group member has become available, is adapted to reset the LSW values of all of the available group members to their respective nominal LSW values.

37. A system for load sharing signaling messages and dynamically adjusting load sharing distribution weights in response to changes in network operating conditions, the system comprising:
   (a) a first communications module for receiving a signaling message that is destined for a signaling destination, which is a member of a load sharing group;
   (b) a load sharing function located on the first communications module and for:
      (i) maintaining load sharing weight (LSW) assignment information for each member of the load sharing group;
      (ii) maintaining maximum load sharing weight threshold (MWT) information for each member of the load sharing group;

(iii) dynamically adjusting LSW assignments in response to a change in availability status of a group member such that the resulting LSW for each available group member does not exceed the associated MWT for each member; and (iv) selecting a member of the load sharing group to receive the signaling message; and (c) a second communications module for receiving the signaling message from the first communications module and for communicating the signaling message to the selected member of the load sharing group, wherein the load sharing function, in response to determining that the sum of the available LS group member LSW values is less than 100%, is adapted to normalize the LSW values associated with the available group members.

38. A system for load sharing signaling messages and dynamically adjusting load sharing distribution weights in response to changes in network operating conditions, the system comprising:

(a) a first communications module for receiving a signaling message that is destined for a signaling destination, which is a member of a load sharing group;

(b) a load sharing function located on the first communications module and for:

(i) maintaining load sharing weight (LSW) assignment information for each member of the load sharing group;

(ii) maintaining maximum load sharing weight threshold (MWT) information for each member of the load sharing group;

(iii) dynamically adjusting LSW assignments in response to a change in availability status of a group member such that the resulting LSW for each available group member does not exceed the associated MWT for each member; and (iv) selecting a member of the load sharing group to receive the signaling message; and (c) a second communications module for receiving the signaling message from the first communications module and for communicating the signaling message to the selected member of the load sharing group, wherein the load sharing function, in response to determining that a LS group member has become available, is adapted to reset the LSW values of all of the available group members to their respective nominal LSW values, and wherein the load sharing function, in response to determining that the sum of the LSW values is less than 100%, is adapted to increase the LSW values in a manner such that the MWT thresholds associated with each of the available members are not exceeded.

39. A computer program product comprising computer-executable instructions embodied in a computer-readable medium for performing steps comprising:

(a) defining a group of signaling destinations as a load sharing (LS) group, wherein defining a group of signaling destinations as a load sharing group includes provisioning a data structure such that post-global-title translated (post-GTT) signaling message traffic is assigned to a load sharing group based on the post-GTT destination point code in each message;

(b) assigning each member of the LS group a nominal load sharing weight (LSW) and a maximum load sharing weight threshold (MWT);

(c) in response to a LS group member becoming unavailable to receive signaling message traffic, distributing the LSW associated with the unavailable member among the remaining available members in a manner such that the MWT thresholds associated with each of the remaining available members are not exceeded, wherein distributing the LSW among the remaining available members Includes dynamIcally altsring relative load sharing nights for entries In the data structure corresponding to the remaining unavailable members of the load sharing group; and (d) load sharing post-GTT signaling message traffic destined for a member of the LS group In accordance with each available group members dynamically aitared LSW.

* * * * *

UNITED STATES PATENT AND TRADEMARK OFFICE
CERTIFICATE OF CORRECTION

PATENT NO. : 7,633,969 B2  Page 1 of 1
APPLICATION NO. : 11/147144
DATED : December 15, 2009
INVENTOR(S) : Caugherty et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1198 days.

Signed and Sealed this

Ninth Day of November, 2010

David J. Kappos
*Director of the United States Patent and Trademark Office*